United States Patent [19]
Lake et al.

[11] Patent Number: 6,077,158
[45] Date of Patent: Jun. 20, 2000

[54] AIR HANDLING CONTROLLER FOR HVAC SYSTEM FOR ELECTRIC VEHICLES

[75] Inventors: Barry J. Lake, Troy, Mich.; Lawrence Ziehr, Holland, Ohio; Lance C. Tagliapietra, Winona; Christopher A. Tuckfield, Dearborn, both of Mich.

[73] Assignee: DaimlerChrysler Corporation, Auburn Hills, Mich.

[21] Appl. No.: 09/190,473

[22] Filed: Nov. 12, 1998

[51] Int. Cl.[7] .................................................... F24F 7/06
[52] U.S. Cl. .......................... 454/70; 454/229; 62/160; 62/180; 165/249
[58] Field of Search ............................. 62/180, 160, 159, 62/186, 244, 176.2, 176.6; 236/49.3; 454/70, 72, 229; 165/202, 204, 248, 249, 42, 43

[56] References Cited

U.S. PATENT DOCUMENTS

| | | | |
|---|---|---|---|
| 4,007,315 | 2/1977 | Brinkmann et al. | 429/62 |
| 4,989,499 | 2/1991 | Scoccia et al. | 454/70 |
| 5,195,574 | 3/1993 | Tanaka et al. | 454/70 X |
| 5,299,431 | 4/1994 | Iritani et al. | 62/243 |
| 5,316,074 | 5/1994 | Isaji et al. | 165/43 |
| 5,320,190 | 6/1994 | Naumann et al. | 180/68.2 |
| 5,385,793 | 1/1995 | Tiedemann et al. | 429/62 |
| 5,395,708 | 3/1995 | Hall | 429/120 |
| 5,467,605 | 11/1995 | Hennessee et al. | 62/133 |
| 5,490,572 | 2/1996 | Tajiri et al. | 180/65.1 |
| 5,501,267 | 3/1996 | Iritani et al. | 165/29 |
| 5,537,831 | 7/1996 | Isaji et al. | 62/228.4 |
| 5,547,125 | 8/1996 | Hennessee et al. | 236/49.3 |
| 5,549,153 | 8/1996 | Baruschke et al. | 165/42 |
| 5,557,941 | 9/1996 | Hanson et al. | 62/160 |
| 5,605,051 | 2/1997 | Iritani et al. | 62/160 |
| 5,987,985 | 11/1999 | Nonoyama et al. | 165/249 X |

*Primary Examiner*—Harry B. Tanner

[57] ABSTRACT

An air-flow management system for controlling the supply air to a motor vehicle passenger compartment is disclosed. The air-flow management system includes a reversible heat pump system for transferring heat energy between an outside environment and a refrigerant. Air from the outside environment, fresh air, and from the passenger compartment, recirculated air, is forced through the air-flow structure by a blower resulting in the transfer of heat energy between the refrigerant and the passenger compartment. A recirculation door provides a means for controlling the mixture of fresh air to recirculated air that flows through the air-flow structure. The position of the recirculation door is selectable by a controller to prevent fogging during the transition from cooling mode to heating mode, minimize the energy expended conditioning the passenger compartment air, and prevent the backflow of unconditioned outside air from the fresh air duct into the recirculation duct.

4 Claims, 15 Drawing Sheets

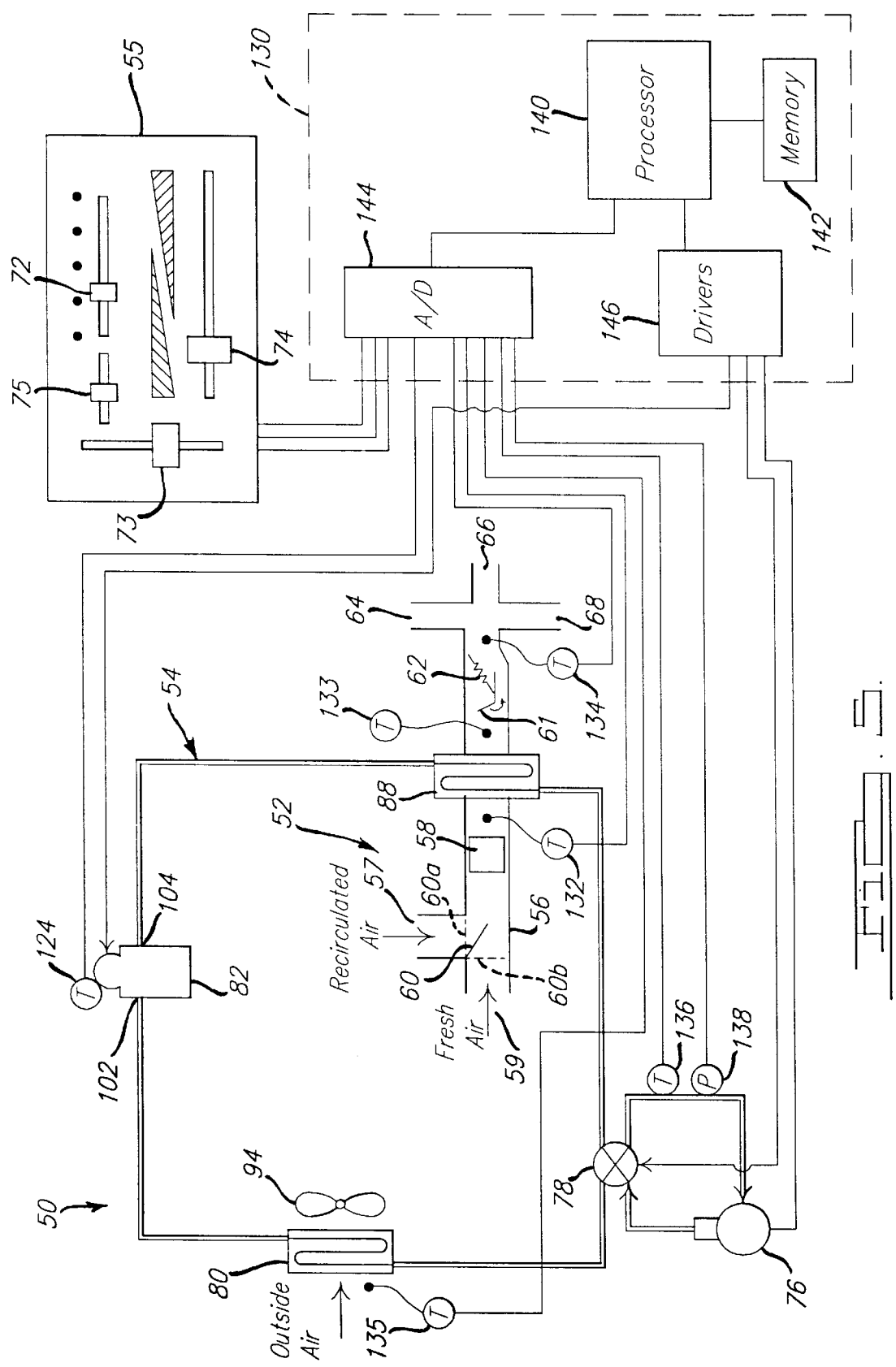

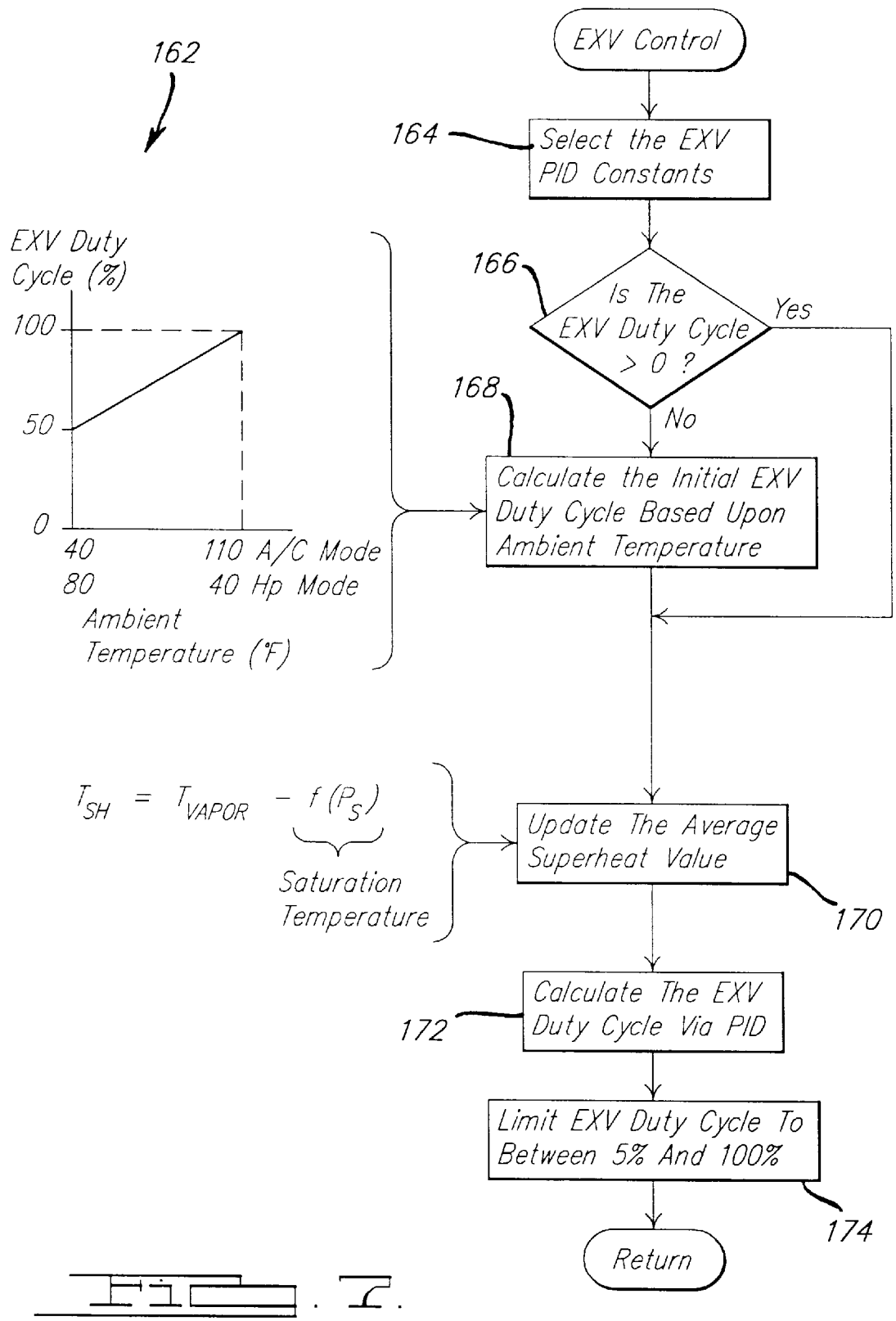

AIR HANDLING CONTROLLER FOR HVAC SYSTEM FOR ELECTRIC VEHICLES

BACKGROUND AND SUMMARY OF THE INVENTION

The present invention relates generally to automotive HVAC systems for controlling the environment of an automobile passenger compartment. More particularly, the invention relates to an air handling system for controlling the positioning of the fresh/recirc door in an automotive HVAC system.

This application is related to co-pending applications all filed on Nov. 12, 1998 and titled Refrigerant Flow Management Center For Automobiles, Reversible Air Conditioning And Heat Pump HVAC System For Electric Vehicles, Controller For Reversible Air Conditioning And Heat Pump HVAC System For Electric Vehicles, Anti-Fog Controller For Reversible Air Conditioning And Heat Pump HVAC System For Electric Vehicles, Controller For Heating In Reversible Air Conditioning And Heat Pump HVAC System For Electric Vehicles, and System For Cooling Electric Vehicle Batteries. Each of these applications is incorporated by reference into the present application.

Automotive heating ventilation and air conditioning, HVAC, systems have traditionally been single loop designs in which the full volume of refrigerant flows through each component in the system. In an HVAC system, refrigerant in the vapor phase is pressurized by a compressor or pump. The pressurized refrigerant flows through a condenser which is typically configured as a long serpentine coil. As refrigerant flows through the condenser heat energy stored in the refrigerant is radiated to the external environment resulting in the refrigerant transitioning to a liquid phase. The liquefied refrigerant flows from the condenser to an expansion valve located prior to an evaporator. As the liquid flows through the expansion valve it is converted from a high pressure, high temperature liquid to a low pressure, low temperature spray allowing it to absorb heat. The refrigerant flows through the evaporator absorbing heat from the air that is blown through the evaporator fins. When a sufficient amount of heat is absorbed the refrigerant transitions to the vapor phase. Any further heat that is absorbed raises the vaporized refrigerant into the superheated temperature range where the temperature of the refrigerant increases beyond the saturation temperature. The superheated refrigerant flows from the outlet of the evaporator to the compressor where the cycle repeats. Generally, the refrigerant flowing into the compressor should be in the vapor phase to maximize pumping efficiency. The operation of the refrigerant loop in conventional automotive HVAC systems is controlled by cycling the compressor on and off, and by varying the volume of refrigerant that is permitted to flow through the expansion valve. Increasing the volume of refrigerant that flows through the valve lengthens the distance traversed by the liquid before it changes to the vapor phase, allowing the heat exchanger to operate at maximum efficiency.

Advances in automotive HVAC systems have led to zone temperature control systems wherein different zones of an automobile are independently controlled. Zone control systems generally include an evaporator and expansion valve for each zone. The refrigerant flows through a compressor and condenser, then is split by a system of valves before flowing to the expansion valve and evaporator of each zone. The refrigerant flowing out of the evaporator of each zone is then recombined before returning to the compressor.

Further advances in automotive HVAC systems has led to the implementation of reversible heat pump systems in automobiles. In a reversible heat pump system the HVAC system can either heat or cool a compartment depending on the direction of the refrigerant flow. In the air conditioning mode refrigerant flows from the compressor through an outside coil (condenser) and into an expansion valve and inside coil (evaporator) before returning to the compressor. Heat energy is extracted from air that is blown through the inside coil (evaporator) into the passenger compartment thus providing cooled air. In the heating mode a four way valve reverses the flow of refrigerant through the coils, thereby reversing the function of the coils. Refrigerant flows from the compressor through the inside coil (condenser) then into an expansion valve and the outside coil (evaporator) before returning to the compressor. Heat energy in the liquefied refrigerant flowing through the inside coil is absorbed by air that is blown through the coil into the passenger compartment thus providing heated air. The air that is blown through the coil is a mixture of fresh outside air and air that is recirculated from the passenger compartment.

Generally, in conventional systems the precise mixture of fresh air to recirculated air is selected by the vehicle occupants. Permitting passengers to exercise absolute control over the air mixture selection normally enhances the comfort of the passengers. However, under some operating conditions it leads to reduced passenger comfort and less than optimal vehicle performance. For example, when a reversible HVAC system switches from air conditioning mode to heat pump mode fogging of the vehicle windows that occurs from moisture evaporating into the conditioned air is more likely if only recirculated air is flowing into the passenger compartment. Another example is air blow-by which occurs when a vehicle increases beyond a particular speed. When an intermediate air mixture setting is selected the increased air pressure from the speed of the vehicle causes air to flow back through the recirc ducts and out the inlets. The air exiting the inlets is unconditioned, directly subjecting passengers to outside air. Not providing automatic override of the air mixture setting can subject passengers to degraded operating conditions in which the solutions are not obvious to the passenger.

One object of the present invention is to provide a system for selectively overriding the passenger air mixture selection to enhance passenger comfort.

Another object of the present invention is to improve vehicle performance by automatically adjusting the air mixture during predetermined vehicle operating modes.

A further object of the present invention is to reduce the heat load on the HVAC system.

Accordingly, the invention provides an air-flow management system for controlling the supply air to a motor vehicle passenger compartment. The air-flow management system includes a reversible heat pump system for transferring heat energy between an outside environment and a refrigerant. Air from the outside environment, fresh air, and from the passenger compartment, recirculated air, is forced through the air-flow structure by a blower resulting in the transfer of heat energy between the refrigerant and the passenger compartment. A recirculation door provides a means for controlling the mixture of fresh air to recirculated air that flows through the air-flow structure. The position of the recirculation door is selectable by a controller to prevent fogging during the transition from cooling mode to heating mode, minimize the energy expended conditioning the passenger compartment air, and prevent the backflow of unconditioned outside air from the fresh air duct into the recirculation duct.

The above described device is only an example. Devices in accordance with the present invention may be implemented in a variety of ways.

BRIEF DESCRIPTION OF THE DRAWINGS

These and other objects of the present invention will become apparent to those skilled in the art from the following detailed description in conjunction with the attached drawings in which:

FIG. 6 is a flow diagram showing an overview of the control program for the preferred embodiment of the invention;

FIG. 7 is a flow diagram illustration of the expansion valve control program for the preferred embodiment of the invention;

DETAILED DESCRIPTION OF THE PREFERRED EMBODIMENT

Figure 1:
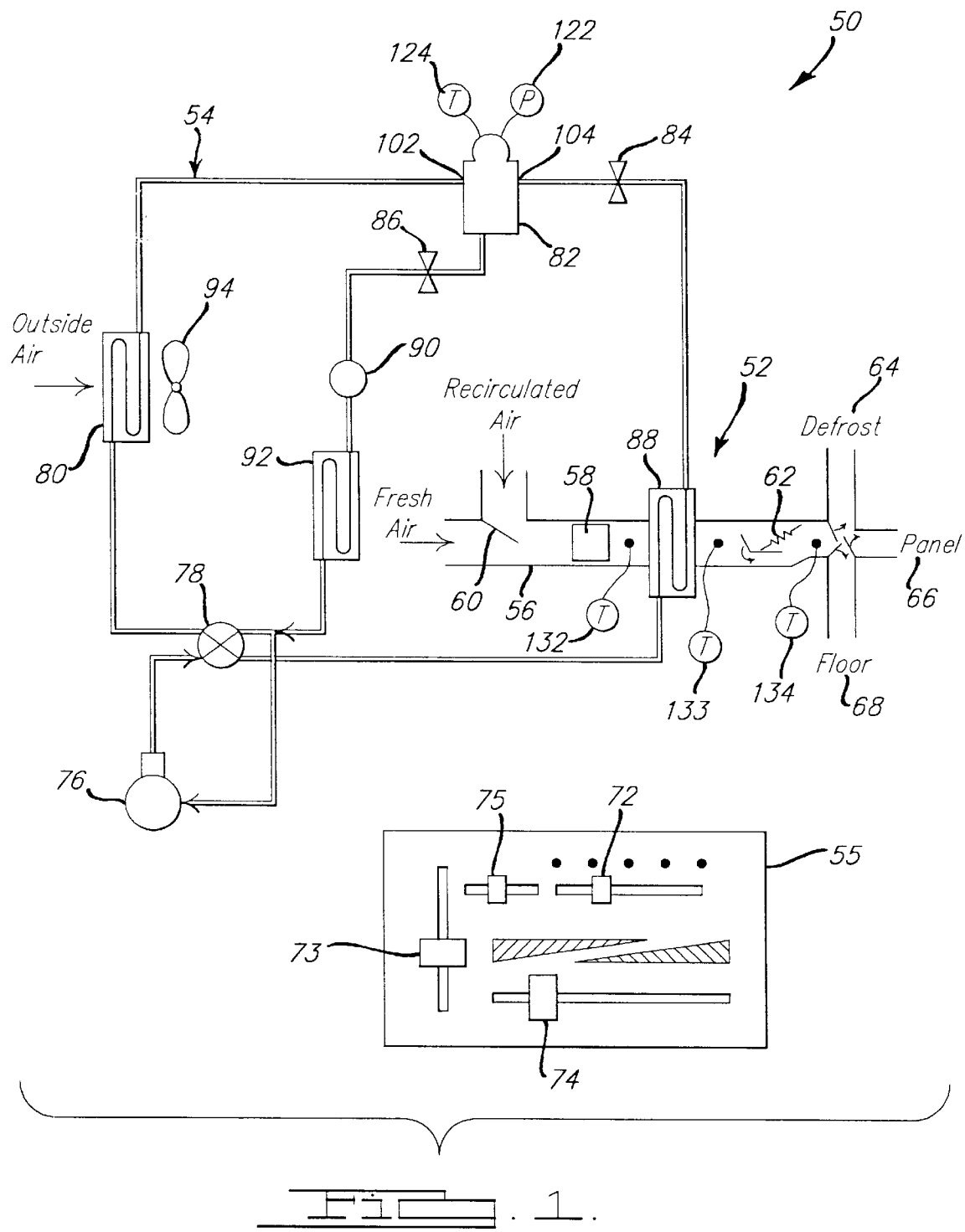
FIG. 1 is a schematic representation of a preferred embodiment of the automotive refrigerant circuit.

FIG. 1 illustrates an exemplary reversible HVAC system 50 for motor vehicles that includes an air-flow structure 52, a refrigerant flow system 54, and a front panel 55 for providing controlling inputs. The reversible HVAC system 50 can both heat and cool the passenger compartment air of a motor vehicle by using the refrigerant flow system 54 in conjunction with the air-flow structure 52 to transfer heat energy between the outside environment and the passenger compartment. In heating mode, heat energy is transferred from the outside environment to air that flows into the passenger compartment and in cooling mode, heat energy is transferred to the outside environment from air that flows into the passenger compartment. The refrigerant flow system 54 acts as a storage medium for heat energy that is being transferred between the outside environment and the passenger compartment. The air-flow structure 52 controls the flow of conditioned air into the passenger compartment. An inside heat exchanger 88 provides an interface between the refrigerant flow system 54 and the air-flow structure permitting the transfer of heat energy between the refrigerant and the air flowing into the passenger compartment. The front panel 55 provides a means for the passengers to control the temperature, flow rate, and operating mode of the HVAC system.

The air-flow structure 52 includes a duct 56 through which air is supplied into the passenger compartment, a blower 58 for introducing air into the duct 56, a recirculation door 60 for controlling the proportion of fresh air to recirculated air, a PTC heater 62 for heating the air, a blend door 60 for controlling the proportion of air that flows over the PTC heater 62, and a set of duct outlets for discharging air into the passenger compartment.

The duct outlets include a defrost outlet 64 for directing air towards the windshield of the vehicle, a panel outlet 66 for directing air towards the upper extremities of the passengers, and a floor outlet 68 for discharging air towards the lower extremities of the passengers. The duct outlets 64–68 are selectively opened and closed by a mode damper 70 which operates in accordance with the position of the mode selector switch 72 located on front panel 55.

The refrigerant flow system 54 is operable in a heating mode and a cooling mode and includes a compressor 76, a four-way switch 78 for controlling the direction of refrigerant flow, an inside heat exchanger 88 for transferring energy between the refrigerant and air flowing into the passenger compartment, an outside heat exchanger 80 for interfacing with the outside environment, a flow management center 82 for reducing the pressure of refrigerant flowing into a heat exchanger that is functioning as an evaporator, shut-off valves 84 and 86 for system protection, zone-control heat exchanger 92 for providing independently controlled cooling to a local region, and pressure reducing device 90 for reducing the pressure of refrigerant flowing into the zone-control heat exchanger 92. The refrigerant flow system 54 interacts with the air-flow structure 52 and the passenger compartment through the operation of the inside heat exchanger 88 during the heating and cooling modes. The function of the inside heat exchanger 88 changes in each operating mode; during heating mode the inside heat exchanger 88 functions as a condenser transferring heat energy to air that passes through air-flow structure 52 into the passenger compartment and during cooling mode the inside heat exchanger 88 functions as an evaporator absorbing heat energy from the air that passes through air-flow structure 52 into the passenger compartment.

The compressor 76 is driven by a variable speed electric motor (not shown). Varying the speed of the electric motor causes a commensurate change in the suction pressure and refrigerant discharge capacity of compressor 76. Although the compressor in the present embodiment is a variable speed compressor, it is within the scope of the invention to employ a single speed compressor. The four-way switch 78 is connected between the compressor 76 and the heat exchangers 80 and 88 to provide a method of changing from air conditioning mode to heat pump mode by reversing the direction of refrigerant flow.

The inside heat exchanger 88 functions as an evaporator during a cooling operation and as a condenser during a heating operation. Inside heat exchanger 88 is arranged within duct 56 so that the air blown through the exchanger 88 is conditioned prior to passing over PTC heater 62 and being discharged through the duct outlets. Shut-off valve 84 provides a means of interrupting refrigerant flow during HVAC operating modes that do not require operation of inside heat exchanger 88. Examples of such operating modes include disabling operation of the inside heat exchanger 88 as an evaporator at low ambient temperatures that could result in freezing of the heat exchanger 88 due to condensation, and modes where only secondary heat exchangers are operational such as zone control heat exchanger 92. Such operating modes include cooling of a battery assembly and cooling of pre-selected regions within the vehicle. The flow management center 82 reduces the pressure of and expands the refrigerant to be supplied to the inside heat exchanger 88 during a cooling operation.

The outside heat exchanger 80, which is generally located towards the front of the vehicle, exchanges heat between the outside air and the refrigerant. A fan 94 ensures a constant supply of outside air flows through outside heat exchanger 80. During air conditioning mode the outside heat exchanger 80 functions as a condenser providing a means for the refrigerant to shed heat to the outside air. During heat pump mode the outside heat exchanger 80 functions as an evaporator absorbing heat energy from the outside air into the refrigerant.

The flow management center 82 provides a centralized device for reducing the pressure of refrigerant flowing into a heat exchanger 80 or 88 functioning as an evaporator and acts as a source of high pressure liquid refrigerant for secondary heat exchangers. Conventional circuits use a separate pressure reducing device with bypass plumbing for each heat exchanger that functions as an evaporator. By using a single flow management center 82 to provide pressure reduced refrigerant the complexity of the refrigerant flow system 54 is greatly reduced. Additionally, a receiver/drier function is integrated into the flow management center 82 for eliminating contaminants and providing a reservoir of pressurized liquid refrigerant. Refrigerant tapped from the receiver portion is routed to pressure reducing device 90 and then to zone-control heat exchanger 92. Although the flow management center in the preferred embodiment includes a receiver/drier function the principles of the invention can be extended to flow management devices that do not include a receiver/drier function.

Figure 2:
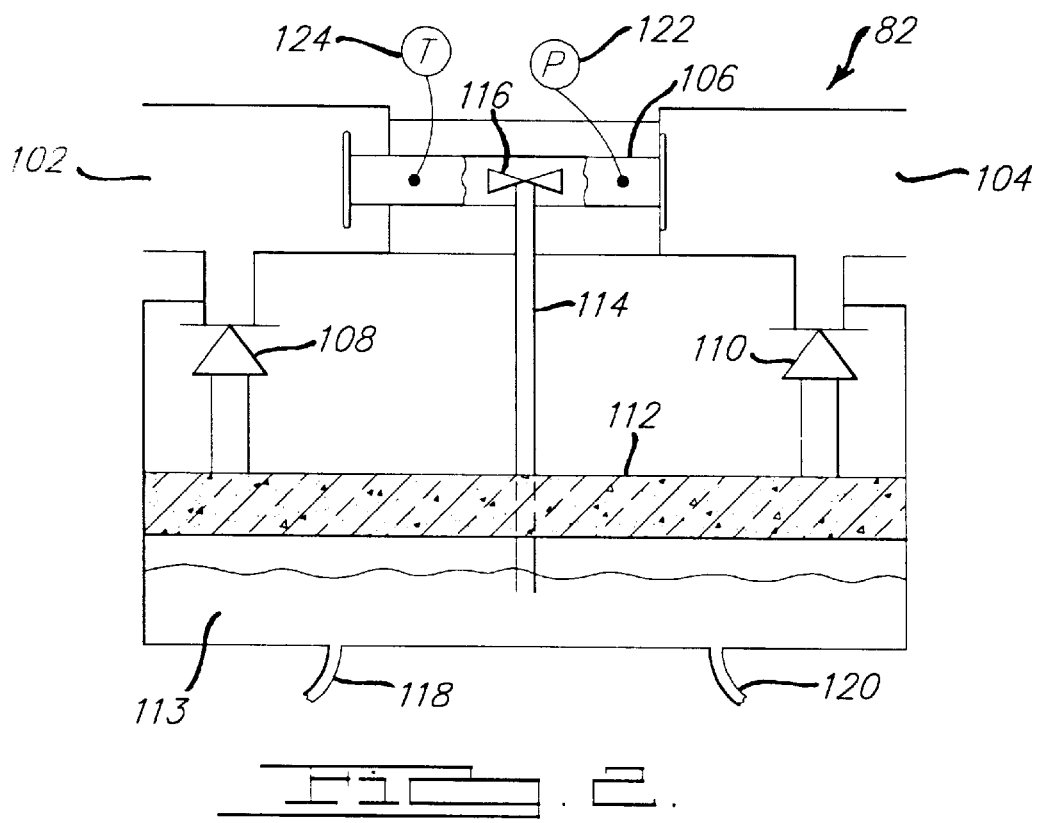
FIG. 2 is a cross-sectional view of the flow management center shown in FIG. 1.

Flow management center 82 is illustrated in greater detail in FIG. 2 to include a housing 100 defining bi-directional ports 102 and 104, a pressure sensitive valve 106, check valves 108 and 110, desiccant 112, a uni-directional flow member 114, pressure reducing valve 116, outlets 118 and 120, temperature probe 124, and pressure probe 122. Pressurized liquid refrigerant flows into bi-directional port 102 or 104, through the corresponding check valve 108 or 110, through the dessicant 112, into reservoir 113, up the uni-directional flow member 114, through pressure reducing device 116 and pressure sensitive valve 106, and finally reduced pressure refrigerant flows out of the other bi-directional port 104 or 102. When the HVAC system 50 changes operating modes the direction of refrigerant flow reverses as high pressure refrigerant flows into the bi-directional port that pressure reduced refrigerant was flowing from. The refrigerant then flows through the corresponding check valve 110 or 108, through the dessicant 112, into reservoir 113, up the uni-directional flow member 114, through pressure reducing device 116 and pressure sensitive valve 106, and finally reduced pressure refrigerant flows out of the other bi-directional port 102 or 104. The pressure sensitive valve 106 permits the flow of pressure reduced refrigerant out of one bi-directional port while preventing high pressure refrigerant from flowing directly between the bidirectional ports. When high pressure refrigerant flows into a bidirectional port 102 and 104 the pressure sensitive valve 106 closes the flow path from the port to the pressure reducing device 116 and opens a path from the pressure reducing device to the other bi-directional port 104 and 102. Closing the flow path from the bi-directional port 102 or 104 to the pressure reducing device forces refrigerant to flow through the corresponding check valve 108 or 110, through the dessicant 112, and into reservoir 113. The opposing check valve 110 or 108 prevents high pressure liquid refrigerant in reservoir 113 from flowing out the opposing bi-directional port 104 or 102. Impurities within the refrigerant are removed by dessicant 112. Reservoir 113 provides a pool of high pressure liquid refrigerant that can be sourced to multiple pressure reducing devices such as device 116 within the flow management center 82 as well as pressure reducing devices that provide reduced pressure refrigerant to secondary heat exchangers. Outlets 118 and 120 provide a means of tapping off refrigerant from reservoir 113 and directing it to secondary heat exchanger circuits. In the preferred embodiment the pressure sensitive valve 106 is a dual poppet valve, however it is envisioned that other valves such as multiple check valves, mushroom valves, reed valves, or rotary valves may be employed. Additionally, similar valves as listed above can replace check valves 108 and 110. Although the pressure reducing device 116 in the preferred embodiment is an electronically controlled expansion valve it is within the scope of the invention to use mechanically controlled expansion valves as well as 90° valves. The desiccant 112 and the temperature and pressure probes 122 and 124 are merely exemplary of additional functions that can be added to the flow management center, they are not required to practice the invention.

Returning to FIG. 1, the zone-control heat exchanger 92, located within the interior of the vehicle provides cooling functions for local zones or assemblies. Examples of local zone cooling include battery assembly cooling, air conditioned seats, and individualized cooling of one side of the passenger compartment. Pressure reducing device 90 reduces the pressure of and expands the refrigerant to be supplied to zone control heat exchanger 92. The expanded refrigerant absorbs heat from the air or liquid which is passed through heat exchanger 92, thereby cooling the air or liquid.

The front panel 55 includes selector switches for setting the operating parameters of the air conditioning circuit 50. The switches include a blower speed selector 73 that in the preferred embodiment is adjustable from 30% to 100% of the maximum blower speed, a mode selector switch 72 having five mode settings, a recirculation selector 75 for selecting fresh or recirculated air, and a sliding temperature lever 74 for setting the temperature of air discharged from the duct outlets. Although the mode selector switch in the preferred embodiment has five discrete settings, the principles of the invention can be extended to a mode selector having an unlimited number of settings.

During cooling mode, the refrigerant discharged from the compressor 76 flows through four-way switch 78 into outside heat exchanger 80 which functions as a condenser. As heat energy stored in the refrigerant is shed to the outside air which is blown through the exchanger 80 the refrigerant condenses to a high pressure liquid. The liquid refrigerant flows into a bi-directional port 102 of the flow management center 82, through the desiccant 112, into the reservoir 113, up the uni-directional flow member 114, through the pressure reducing valve 116, and then out the other bi-directional port 104. A portion of the refrigerant is tapped off from the reservoir 113 and directed towards a secondary loop as shown in FIG. 1 will be explained in a later paragraph. The refrigerant flowing through the pressure reducing valve 116 is pressure reduced and then passes through the other bi-directional port 104. The pressure reduced refrigerant flows into the inside heat exchanger 88 which functions as an evaporator. Heat energy from air passing through inside heat exchanger 88 is absorbed by the pressure reduced refrigerant causing the refrigerant to change to the vapor state. The vapor state refrigerant flows from the heat exchanger 88 through the four-way switch 78 and back to the inlet of compressor 76 which compresses the vapor and directs it through four-way switch 78 to outside heat exchanger 80.

The operation of the secondary loop during cooling mode is as follows. The portion of refrigerant that flowed from an outlet in reservoir 113 flows through shut-off valve 86 into pressure reducing device 90. Pressure reduced refrigerant flows out of device 90 into local-zone heat exchanger 92 which functions as an evaporator. The refrigerant absorbs heat from the air which passes through it thereby providing separately controlled cooling for a portion of the passenger compartment. Although the zone control heat exchanger 92 in the preferred embodiment functions as an air-to-refrigerant evaporator, it is within the scope of the invention to employ other heat exchangers such as refrigerant-to-refrigerant, water-to-refrigerant, and oil-to-refrigerant heat exchangers.

During heating mode, the direction of refrigerant flow is reversed by changing the orientation of four-way switch 78. A signal from a controller 130, hereinafter described, controls the orientation of four-way switch 78. The refrigerant discharged from the compressor 76 flows through four-way switch 78 into inside heat exchanger 88 which functions as a condenser. As heat energy stored in the refrigerant is shed to the inside air which is blown through the exchanger 88 the refrigerant condenses to a high pressure liquid. The liquid refrigerant flows into the bi-directional port 104 of the flow management center 82, through the desiccant 112, into the reservoir 113, up the uni-directional flow member 114, through the pressure reducing valve 116, and then out the other bi-directional port 102. The refrigerant flowing through the pressure reducing valve 116 is pressure reduced and then passes through bi-directional port 102. The pressure reduced refrigerant flows into the outside heat exchanger 80 which functions as an evaporator. Heat energy from air passing through outside heat exchanger 80 is absorbed by the pressure reduced refrigerant causing the refrigerant to change to the vapor state. The vapor state refrigerant flows from the heat exchanger 80 through the four-way switch 78 and back to the inlet of compressor 76 which compresses the vapor and directs it back through four-way switch 78 to inside heat exchanger 88.

During heating mode, the secondary loop operates in the same manner as during a cooling mode. Refrigerant from outlet 118 of flow management center 82 flows through pressure reducing device 90 and into local-zone heat exchanger 92 in which it absorbs heat from air that is passing through the exchanger 92. Pressure reducing device 90 pressure reduces the refrigerant to increase its capacity to absorb heat energy from air or fluid flowing through the heat exchanger 92.

Employing flow management center 82 in reversible HVAC system 50 greatly simplifies the interconnecting plumbing and permits more reliable implementation of secondary cooling loops. It is possible to alternately heat and cool a vehicle with two heat exchangers without the additional valves and plumbing required for conventional systems. Complex refrigerant balancing schemes for dividing refrigerant amongst multiple heat exchanger loops are not required, thereby improving system performance, increasing system reliability, and reducing cost. A common sense point at the outlet of pressure reducing device 116 is provided for pressure reduced (low-side) refrigerant. Sensing temperature and pressure at the flow management center eliminates the need of conventional systems for sensing at the inlet to each heat exchanger.

Figure 3A:
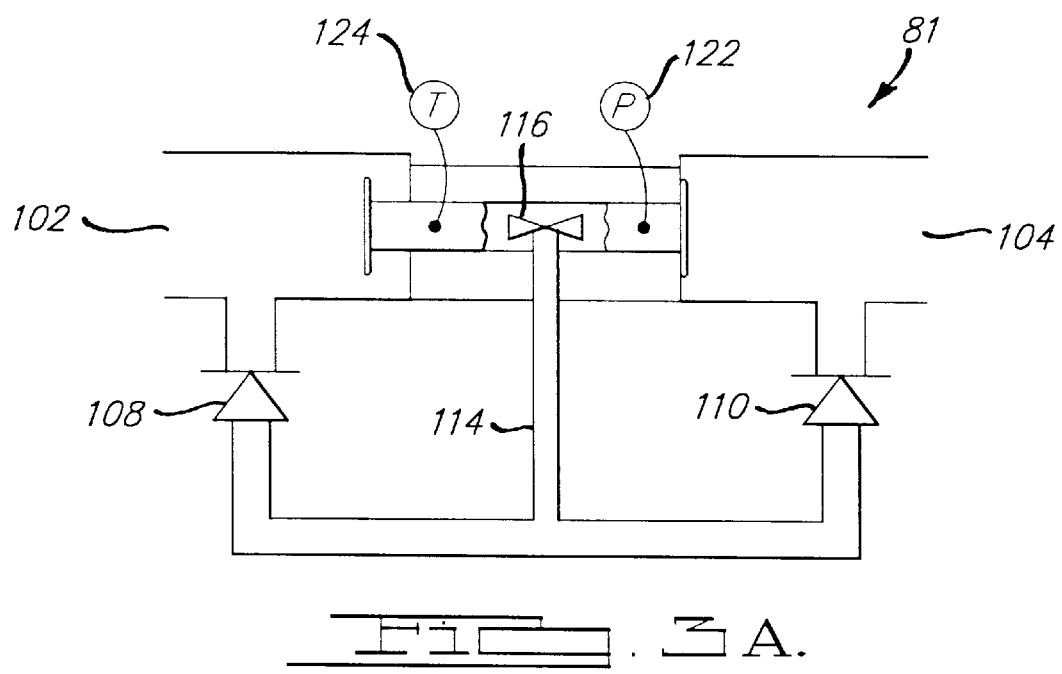
FIGS. 3a and 3b present cross-sectional views of flow management devices embodying the present invention.
Figure 3B:
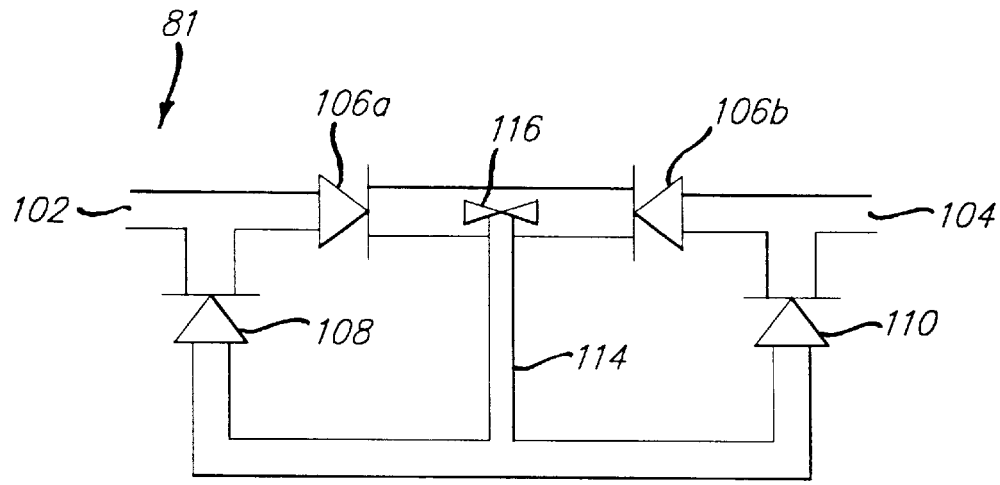

Referring to FIGS. 3a and 3b, an alternate flow management device 81 is illustrated which does not include the receiver/drier function, but provides reversibility with simpler plumbing than conventional systems and a single pressure reducing device. The flow management device includes a housing 100 defining bi-directional ports 102 and 104, a pressure sensitive valve 106, check valves 108 and 110, a uni-directional flow member 114, temperature probe 122, and pressure probe 124. The flow management device 81 includes all the capabilities of the flow management center 82 with the exception of the receiver/drier function.

Figure 4:
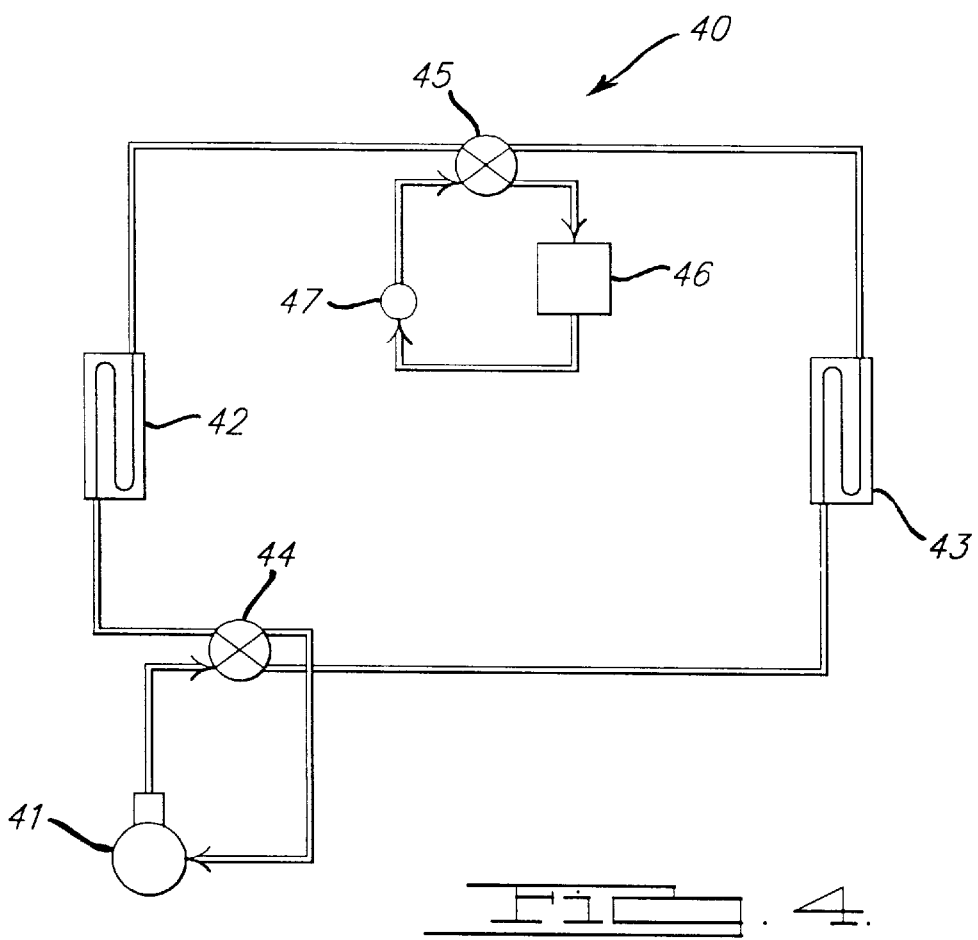
FIG. 4 is a schematic representation of an alternative automotive refrigerant circuit.

FIG. 4 illustrates another embodiment of an automotive air conditioning circuit 40 that includes a compressor 41, an outside heat exchanger 42, an inside heat exchanger 43, two four-way switches 44 and 45, a receiver/drier 46, and an electronic expansion valve 47.

Four-way switch 45, receiver/drier 46, and expansion valve 47 functionally replace the flow management center 82 that is employed in circuit 50 (see FIG. 1). The function of four-way valve 45 is the mirror image of the function of four-way valve 44. Valve 44 is employed to reverse the flow of refrigerant through the heat exchangers 42 and 43. It essentially converts uni-directional refrigerant flow from the compressor 41 into bidirectional refrigerant flow into the heat exchangers 42 and 43. Whereas four-way valve 45 converts bi-directional refrigerant flow from the heat exchangers 42 and 43 into a unidirectional flow through receiver/drier 46 and expansion valve 47.

Receiver/drier 46 removes contaminants from the refrigerant and ensures a continuous flow of high pressure liquid refrigerant into expansion valve 47. Expansion valve 47 provides refrigerant pressure reduction and expansion for heat exchangers 42 and 43. Expansion valve 47 is preferably an electronic expansion valve that receives its controlling inputs from a controller that monitors the saturation and superheat temperature of the heat exchangers 42 and 43. However, other pressure reducing devices such as block valves, 90° valves, and thermal expansion valves (TXV) are within the scope of the invention. Generally, to control a TXV, refrigerant at the superheat temperature and the saturation temperature must be routed to the device. To obtain the superheat temperature the refrigerant from four-way valve 44 to the compressor 41 inlet can be routed through the TXV. For the saturation temperature the refrigerant emitted from the TXV can be sensed.

During cooling mode outside heat exchanger 42 functions as a condenser shedding heat to the outside environment and inside heat exchanger 43 functions as an evaporator absorbing heat from air that is blown into the passenger compartment. The refrigerant cycle is as follows: refrigerant flows out of compressor 41, through four-way valve 44, into the outside heat exchanger 42, through four-way valve 45, into receiver/drier 46 and expansion valve 47, through four-way valve 45, to inside heat exchanger 43, through four-way valve 44, and back to compressor 41.

During heating mode four-way valve 44 changes orientation causing the flow of refrigerant to heat exchangers 42 and 43 to reverse. With the reversal in the direction of refrigerant flow the functions of the heat exchangers 42 and 43 reverse as inside heat exchanger 43 functions as a condenser and outside heat exchanger 42 functions as an evaporator. In addition, the orientation of four-way valve 45 is also changed to ensure that the direction of refrigerant flowing into receiver/drier 46 and expansion valve 47 remains constant. The refrigerant cycle during heat pump mode is as follows: refrigerant flows out of compressor 41, through four-way valve 44, into the inside heat exchanger 43, through four-way valve 45, into receiver/drier 46 and expansion valve 47, through four-way valve 45, to outside heat exchanger 42, through four-way valve 44, and back to compressor 41.

From the foregoing it will be understood that the invention provides a flow management device with bi-directional ports in which refrigerant flowing into either port passes through an expansion valve and exits the other port. Additionally, the invention can integrate the receiver/drier function into a flow management device with bi-directional ports to provide the capability of tapping off refrigerant flow for secondary cooling circuits. Also, the present invention decreases the complexity of automotive HVAC systems by integrating a flow management device into the system to reduce the number of valves required to implement a reversible heating and cooling HVAC system. A further capability of the invention is to provide a centralized flow management center with taps for refrigerant to reduce the complexity of automotive HVAC systems that implement multi-zone control.

Figure 5:
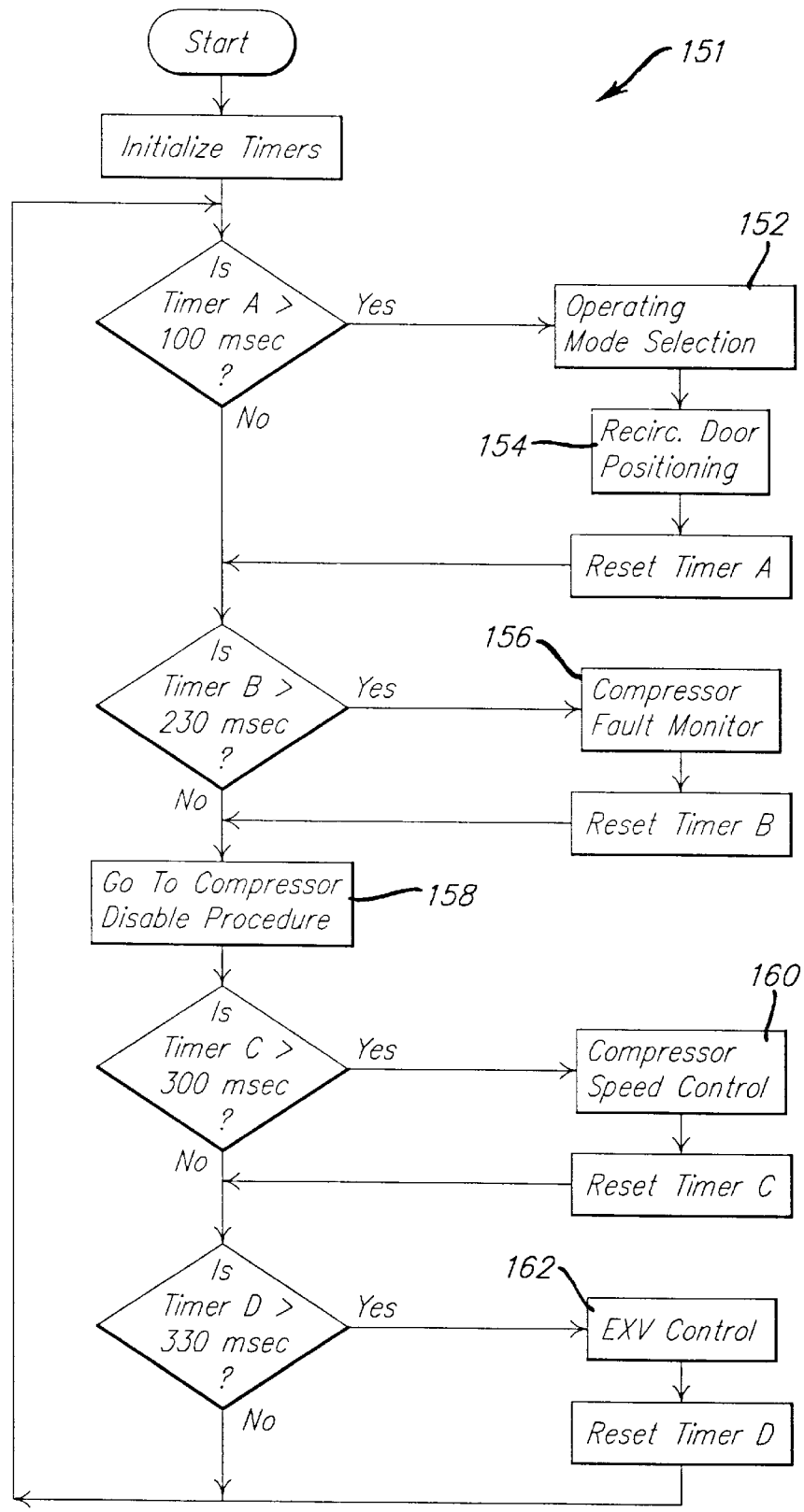
FIG. 5 is a block diagram illustration of the control circuit interconnection to a reversible HVAC refrigerant circuit.

Control System For Reversible Air Conditioning And Heat Pump HVAC System For Electric Vehicles FIG. 5 illustrates the control system configuration to implement the preferred embodiment of the HVAC circuit 50. In FIG. 5 the outside coil 80, flow management center 82, inside heat exchanger 88, four-way switch 78, compressor 76, duct 56, and front panel 55 are interconnected in a manner similar to circuit 50 illustrated in FIG. 1. Additionally illustrated is controller 130 which controls the compressor speed and flow management center 82 operation based upon inputs from front panel 55, duct 56, and the refrigerant system 54.

During operation of the HVAC circuit 50, the passenger selects a passenger compartment temperature and operating mode by setting the switches of front panel 55. The front panel 55 switch settings are decoded by the controller 130, which converts the settings to values that represent desired temperature, operating mode, and blower speed. The controller 130 also monitors sensors that measure the actual ambient and passenger compartment temperature as well as refrigerant temperature and pressure. The controller 130 compares the decoded settings to the actual ambient and passenger compartment temperature, and generates signals that modify the operation of the refrigerant flow system 54 and air-flow structure 52 to bring the actual passenger compartment temperature in conformance with the desired temperature as represented by the front panel 55 switch settings.

The operation of the refrigerant flow system 54 is modified by controller 130 through output signals that control the orientation of the four-way switch 78, the speed of compressor 76 and the duty cycle applied to the pressure reducing device 116 within the flow management center 82. Changing the orientation of four-way switch 78 causes a reversal in the direction of refrigerant flow. The direction that refrigerant flows dictates whether the HVAC system is in the heating mode or the cooling mode by interchanging the functions of the outside heat exchanger 80 and the inside heat exchanger 88. In heating mode the outside heat exchanger 80 functions as an evaporator and the inside heat exchanger 88 functions as a condenser 88. Whereas, in cooling mode the outside heat exchanger 80 functions as a condenser and the inside heat exchanger 88 functions as an evaporator. Varying the speed of compressor 76 during a cooling mode or a heating mode causes a change in the refrigerant temperature at the compressor 76 inlet and outlet, which has a direct effect on the temperature of air blown into the passenger compartment. Changing the duty cycle applied to the pressure reducing device 116 during either cooling or heating mode causes a variation in the quantity of refrigerant that the pressure reducing device 116 permits to flow into the heat exchanger 80 or 88 that is functioning as an evaporator. Too much refrigerant flowing through the evaporator leads to flooding the compressor 76, causing degraded compressor 76 performance. Too little refrigerant flowing through the evaporator limits the efficiency of the evaporator in absorbing heat, resulting in a reduced cooling or heating capacity of the HVAC system 50. The controller 130 constantly adjusts the duty cycle applied to the pressure reducing device to keep the evaporator operating at maximum efficiency and adjusts the speed of compressor 76 to control the temperature of the air blown into the passenger compartment.

The air-flow structure 52 operation is modified by changing the position of blend door 61 and the position of recirculation door 60. Changing the position of blend door 61 changes the amount of supplemental electric heating that is applied to the air flowing through the air-flow structure 52, directly effecting the temperature of the passenger compartment. The position of recirculation door 60 controls whether fresh air from the outside or recirculated air from inside is directed into the passenger compartment. Typically, more energy is required to heat or cool fresh air than recirculated air because of the greater differential between the temperature of the air flowing into the HVAC system 50 and the desired passenger compartment temperature.

Inputs to controller 130 from the front panel 55 include blower speed from blower speed selector 73, mode selection from mode selector switch 72, and the target temperature from temperature lever 74. The duct 56 inputs include inlet and outlet temperatures from temperature probes 132, 133, and 134. Inputs from the refrigerant system 54 to the controller 130 include temperature probe 135 for sensing ambient temperature, temperature probe 124 for sensing the expansion valve 116 outlet temperature, temperature probe 136 for sensing superheat temperature, and pressure probe 138 for sensing suction pressure.

Controller 130 is preferably a microprocessor-based controller, that includes a processor 140 and associated memory 142. An analog-to-digital converter (A/D) 144 converts signals from the various sensors to a digital form used by processor 140. A driver circuit 146 operates the flow management center 82 and compressor 76. This may be for example an interface circuit that connects to the electric motor for driving the compressor 76 in response to system temperature inputs. The interface circuit may also provide a duty cycle signal for controlling the expansion valve 116 to maintain a regulated average superheat temperature in the compressor suction line. Additionally, the driver 146 may include an interface circuit coupled to four-way switch 78 for reversing the switch from cooling mode to heating mode.

Processor 140 includes a main program 151, depicted in the flowchart of FIG. 6, to control the operating mode selection, compressor speed control, and electronic expansion valve (EXV) control. FIG. 6 gives an overview of the control strategy illustrating the major functional modules that are involved.

Referring to FIG. 6, the main program 151 is illustrated. The main program 151 provides the timing for execution of the various control modules. At step 152 the program enters the operating mode selection module in which the operating mode of the system is selected. The supported operating modes include defrost mode, vent mode, PTC heater mode, heat pump mode, and air conditioning mode. The inputs monitored by the controller 130 to select the HVAC system 50 operating mode include the position of mode selector switch 72, temperature lever 74, inlet temperature, and during a heating operation the capacity of heat pump mode. Although the preferred embodiment has five discrete operating modes, the principles of the invention can be extended to systems having either fewer operating modes or a continuously variable set of operating modes.

Figure 16:
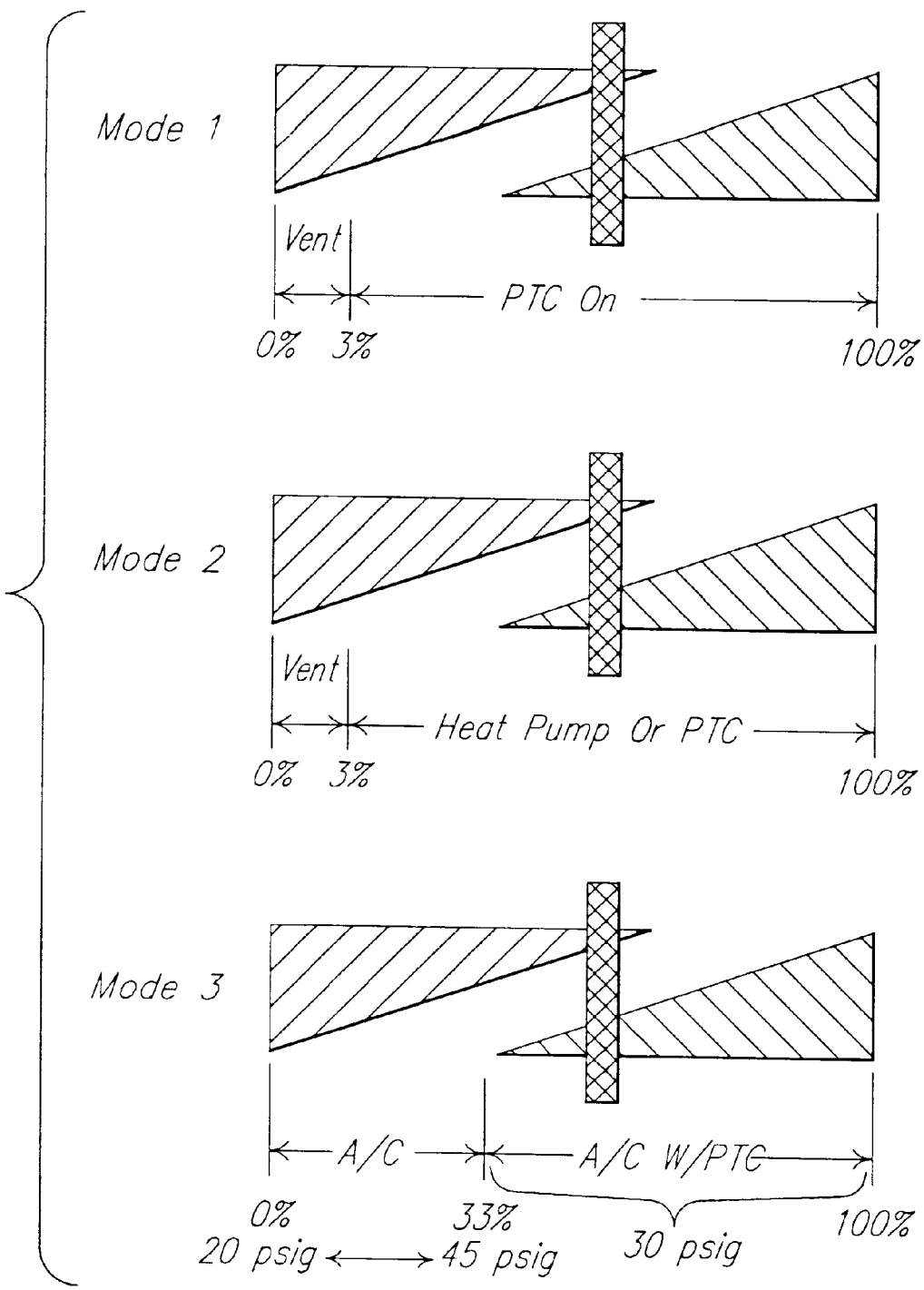
FIG. 16 is a datagram illustrating the relationship between the temperature lever position and the corresponding operating mode.

FIG. 16 illustrates the system operating modes. During the PTC heater/defrost mode, when the ambient temperature is less than 40° F., controller 130 turns on the PTC heater 62 and moves the blend door to a position determined by the location of temperature lever 74. However, for the first 3% of temperature lever 74 travel from the full cold position the controller turns off PTC heater 62 and only enables the vents.

In the heating mode, with ambient temperatures greater than 40° F. or defrost operation with ambient temperatures between 40° F. and 60° F., controller 130 turns on the heat pump and if necessary the PTC heater with blend door to generate the desired temperature that is reflected by the position of temperature lever 74. For the first 3% of temperature lever 74 travel from full cold the controller 130 turns off the heat pump and PTC heater 62 and only enables the vents. At temperatures greater than 100° F. the controller 130 turns off PTC heater 62.

The third operating mode, cooling mode, is selectable for ambient temperatures that are greater than 40° F. Cooling mode is also used for defrost when the ambient temperature is greater than 60° F. For the first 33% of temperature lever travel the controller 130 varies the compressor suction pressure set point from 20 to 45 psig as the temperature lever 74 is moved from cold to warm. Varying the suction pressure set point causes a direct change in the compressor speed, thereby causing the air temperature at the duct outlets to change. From 33% to 100% of temperature lever travel the controller 130 sets the compressor 76 suction pressure to a constant 30 psig and turns on the PTC heater 62 to reheat the conditioned air.

Figure 8:
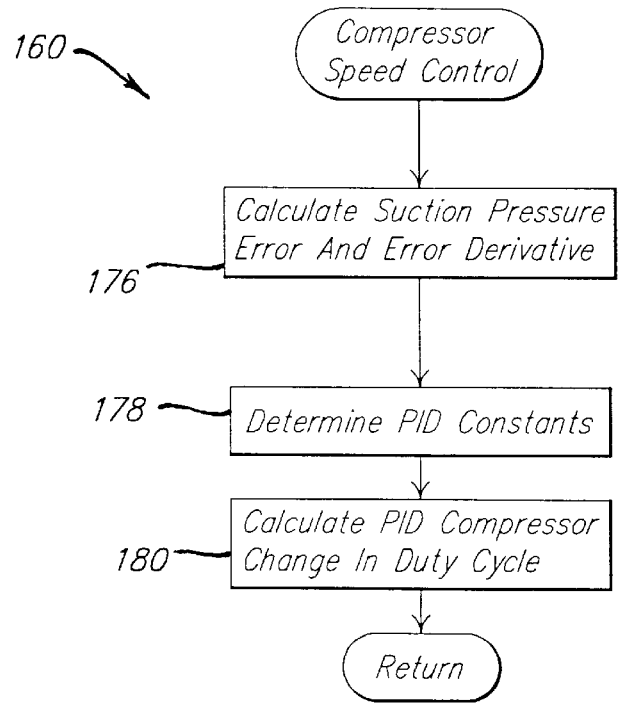
FIG. 8 is a flow diagram of the compressor speed control module for the preferred embodiment of the invention.

Returning to FIG. 6, at step 154 the program enters the recirculation door positioning module which is described below with reference to FIG. 13. The recirculation door positioning module controls the proportion of fresh air to recirculated air that is blown into the passenger compartment. At steps 156 and 158 the program enters modules for monitoring and disabling the compressor in response to detected faults. The compressor speed control module, which is described below with reference to FIG. 8, is entered at step 160. Varying the speed of compressor 76 causes a proportional change in the air temperature blown from the duct outlets 64–68. Step 162 leads to the EXV control module which is described with reference to FIG. 7. The EXV control module 162 modulates the output of the expansion valve 116 in response to changes in the vapor temperature sensed at the compressor 76 and the compressor suction pressure. Each of the above listed modules will now be further explained.

FIG. 7 illustrates the detailed operation of EXV control module 162. The module 162 controls the volume of refrigerant that is pressure reduced by the expansion valve 116 to maintain a relatively constant superheat temperature at the outlet of the evaporator. As low-pressure refrigerant flows from the expansion valve 116 through the evaporator it absorbs heat from the air passing through the evaporator. After absorbing sufficient heat the low-pressure refrigerant transitions to a vapor state. Any further heat that is absorbed by the vapor raises the refrigerant temperature above the saturation temperature into a superheated temperature region. To reduce the outlet temperature of the refrigerant the volume of refrigerant flowing into the evaporator is increased, thereby increasing the heat load capacity of the refrigerant. However, if there is too great a volume the refrigerant will not transition to the vapor state, resulting in the compressor 76 being swamped by liquid refrigerant. An insufficient volume of refrigerant flowing into the evaporator results in the refrigerant transitioning to the vapor state before reaching the outlet of the evaporator. Vapor state refrigerant has less capacity to store heat energy than liquid state refrigerant, therefore the portion of the evaporator that contains vapor state refrigerant has less capacity to store heat energy, reducing the efficiency of the evaporator. It is desirable to control the EXV 116 such that the liquid to vapor transition occurs slightly before the outlet of the evaporator causing the refrigerant to superheat a predetermined amount. This maximizes the efficiency of the evaporator by ensuring that virtually the entire coil is used for absorbing heat.

In step 164 the proportional-integral-differential (PID) constants are chosen based upon whether the system is in heating mode or cooling mode. The selection of PID constants is based upon the particular system characteristics and is well known in the art. Following selection of the PID constants the EXV control module proceeds to steps 166 and 168 wherein the expansion valve duty cycle is initialized based upon ambient temperature and operating mode when the system first enters either heat pump mode or air conditioning mode. The graph appended to step 168 depicts the selection criteria for the duty cycle. Ambient temperature is sensed by temperature probe 135 located in front of the outside heat exchanger 80. The initial duty cycle is then set to a value ranging from 50% to 100% of the maximum EXV duty cycle depending on the ambient temperature. After setting the initial expansion valve duty cycle the system transitions through a start-up period before settling into steady-state operation.

During steady-state operation the duty cycle of the EXV is varied in order to maintain a constant superheat temperature, 4° F. greater than the saturation temperature, at the inlet to compressor 76. At step 170 the average superheat temperature is calculated by measuring the vapor temperature of refrigerant exiting the evaporator and subtracting the saturation temperature of the fluid. The saturation temperature is obtained by measuring the compressor inlet suction pressure and using the saturation temperature that corresponds to the suction pressure. Although the present embodiment of the invention calculates the average superheat temperature from the vapor temperature and suction pressure, it is within the scope of the invention to use the vapor temperature with an evaporator inlet temperature including compensating for the evaporator pressure drop. The outlet of the expansion valve 116 located in the flow management center provides a common temperature measurement location for evaporator inlet temperature in either heating mode or cooling mode. In conventional systems that use the evaporator inlet temperature to calculate the superheat temperature; temperature probes are required at the inlets to both the inside and outside heat exchangers to provide inlet temperature in both operating modes.

The updated superheat temperature from step 170 is used at step 172 to calculate a revised setting for the EXV duty cycle. As a final step, at step 174 the controller 130 limits the value of the EXV duty cycle to between 5% and 100% to ensure the device remains within a known operating region.

Referring to FIG. 8, the compressor speed control module 160 is illustrated. The compressor speed is controlled by applying a variable duty cycle to the electric motor that drives the compressor 76. The duty cycle is varied in response to a controlling input such as temperature lever position and compressor suction pressure. Varying the speed of compressor 76 causes a proportionate variation in the discharge temperature and discharge pressure of refrigerant flowing out of the compressor 76 as well as an inversely proportional change in the compressor suction pressure and refrigerant suction temperature. The increased refrigerant discharge temperature results in an increased condenser temperature, increasing the capacity of the HVAC system 50 to provide heat during heating mode. The decreased refrigerant suction temperature results in a decreased evaporator temperature, increasing the capacity of the HVAC system 50 provide cooling during cooling mode. The speed of the compressor 76 is therefore varied to maintain air blown into the passenger compartment at a relatively constant temperature during both heating mode and cooling mode.

The desired temperature is set by adjusting the temperature lever 74 on front panel 55. The controller 130 calculates the target suction pressure corresponding to the temperature lever position (x/L) which is equal to 20+75*(x/L) for a lever travel distance equal to 33% of the available distance. Using the suction pressure as the controlled parameter instead of air temperature provides a more stable and faster responding system.

Conventional systems that use air temperature as the controlled parameter have problems with surging of the compressor 76 in addition to slow response time. As the sensed outlet air temperature changes due to transient effects including changes in vehicle speed or passing through intermittent sunlight, the compressor speed is changed in an attempt to keep the outlet temperature constant. When the compressor speed is constantly changing the passenger perceives the changes as surging in the propulsion of the vehicle. In the preferred embodiment, the EXV control loop regulates a constant outlet temperature while the compressor regulates a constant suction pressure. As the outlet air temperature changes the heat that is transferred between the refrigerant and the inside heat exchanger varies, causing the refrigerant superheat temperature to change. In response to the change in the superheat temperature the duty cycle of pressure reducing valve 116 is changed by controller 130, causing a shift in the flow of refrigerant, resulting in a slight variation of the compressor suction pressure. The controller 130 then modifies the speed of compressor 76 to bring it in conformance with the target suction pressure. However, the required change in the speed of the compressor 76 is significantly less than the change that would be required in an HVAC system that uses compressor speed alone to compensate for changes in outlet temperature. The minor change in compressor speed is imperceptible to the passengers, leading to enhanced driving comfort.

In addition to eliminating surging, the response time of HVAC system 50 is reduced by using suction pressure as the controlled input. Cooling air at the desired temperature is blown over passengers in significantly less time than conventional systems that control air temperature directly. As a result, unlike conventional systems, PTC heating of the cooled air is not required to provide fine control over the air temperature, resulting in more energy efficient vehicle operation.

During heat mode the compressor speed is varied in reaction to changes in the temperature of the air flowing out of the inside heat exchanger 88. In heat pump mode, unlike air conditioning mode, suction pressure is not directly related to the temperature of air flowing out of the inside heat exchanger. Therefore the air temperature sensed by temperature probe 133 is used as the controlling input for compressor speed.

In step 176 the controller 130 calculates the error and error derivative to be used in the PID controller for the controlled input. In air conditioning mode the controlled input is the suction pressure and in heat pump mode the controlled input is the post inside heat exchanger air temperature measured by temperature probe 133. In step 178 the PID constants corresponding to the appropriate operating mode are selected. Then in step 180 the PID controller calculates the change in compressor duty cycle based on the PID constants and the calculated error and error derivative. The revised duty cycle is limited to between 5% and 90% to ensure the compressor 76 is operated within specified parameters.

Figure 9:
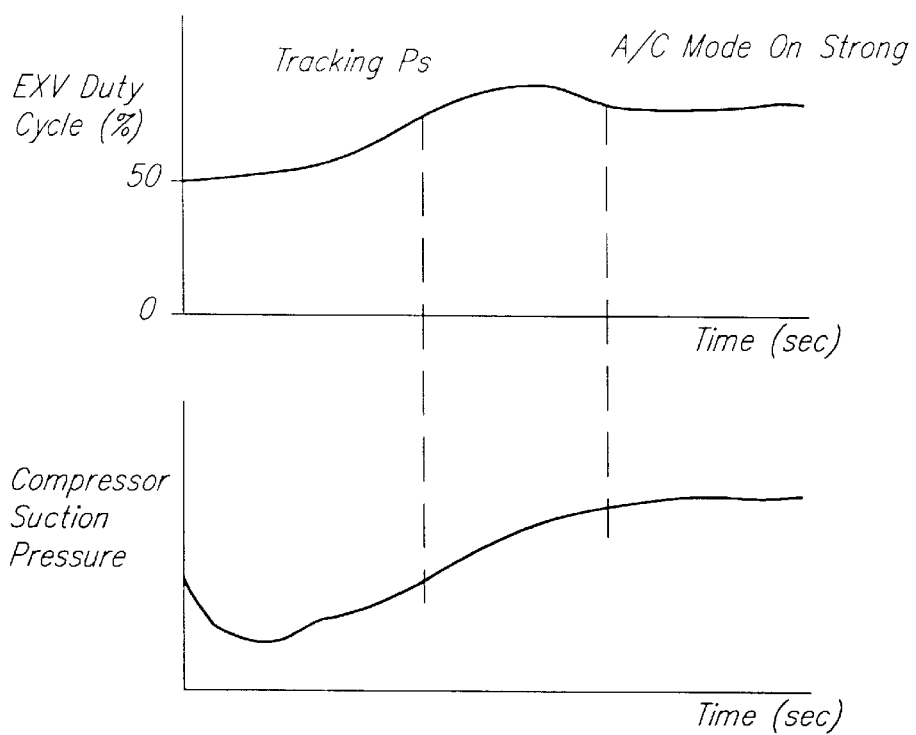
FIG. 9 is a diagram illustrating the interaction between the expansion valve and compressor during the turn-on transition.

FIG. 9 illustrates the interaction between the EXV control loop and the compressor speed control loop during the cooling mode start-up transition. As explained the EXV control loop regulates the volume of refrigerant that flows through pressure reducing device 116 maintaining a predetermined refrigerant superheat temperature at the outlet of the evaporator. A secondary effect of the EXV operation is that as the EXV permits an increased volume of refrigerant to flow, the suction pressure at the inlet to compressor 76 decreases. The operation of the compressor 76 has a corresponding interaction with the EXV. When the speed of compressor 76 is changed, the resulting change in suction pressure and temperature at the inlet to compressor 76 causes a change in the saturation temperature of refrigerant that flows through the evaporator. Increased compressor 76 speed, causes a lower suction pressure, leading to a lower saturation temperature, resulting in the refrigerant temperature rising to the predetermined superheat temperature earlier in the traverse of the evaporator. The EXV loop compensates for the change in superheat temperature by permitting an increased volume of refrigerant to flow through the evaporator, thereby causing a higher suction pressure. When the HVAC system 50 first turns on, if the pressure reducing valve 116 is set to an initial duty cycle of 0%, the volume of refrigerant flowing through the evaporator will lag the compressor speed throughout the entire start-up time period, delaying the start-up, resulting in a start-up time period of approximately 2.5 minutes.

Assuming an ambient temperature of 40° F., the EXV is set to an initial duty cycle of 50% at step 168 (see FIG. 7). The compressor suction pressure is set to achieve the target suction pressure corresponding to the location of temperature lever 74. Initially, the compressor suction pressure decreases slightly during the first seconds of operation as fluid pours through the EXV, then as the compressor spins up towards steady-state speed suction pressure begins to increase significantly. At the same time the EXV duty cycle increases until the suction pressure has increased to a point where the EXV begins to track the suction pressure. During the early stages of start-up it is not unusual for the compressor to flood until the compressor speed increases a sufficient amount to develop appropriate suction pressure. In the preferred embodiment the compressor is operated on the borderline of flooding during the start-up transition thereby contributing to a faster system response time. Also, as the EXV duty cycle begins to track the suction pressure it will overshoot its steady-state value by a slight amount. The underdamped response displayed by the EXV control loop results in a further reduction in the system response time. In combination the improvements result in air cooled to the desired temperature blowing over the faces of passengers within approximately 35 seconds of system start-up.

From the foregoing it will be understood that the invention provides a system for improving the steady-state response time of an automotive HVAC system. Additionally, the invention permits a reduction in the start-up time of an automotive air conditioning system.

Also, the invention provides a system for controlling an HVAC system that employs a flow management device. The invention further provides a system for controlling an HVAC system incorporating a centralized flow management center.

Figure 10:
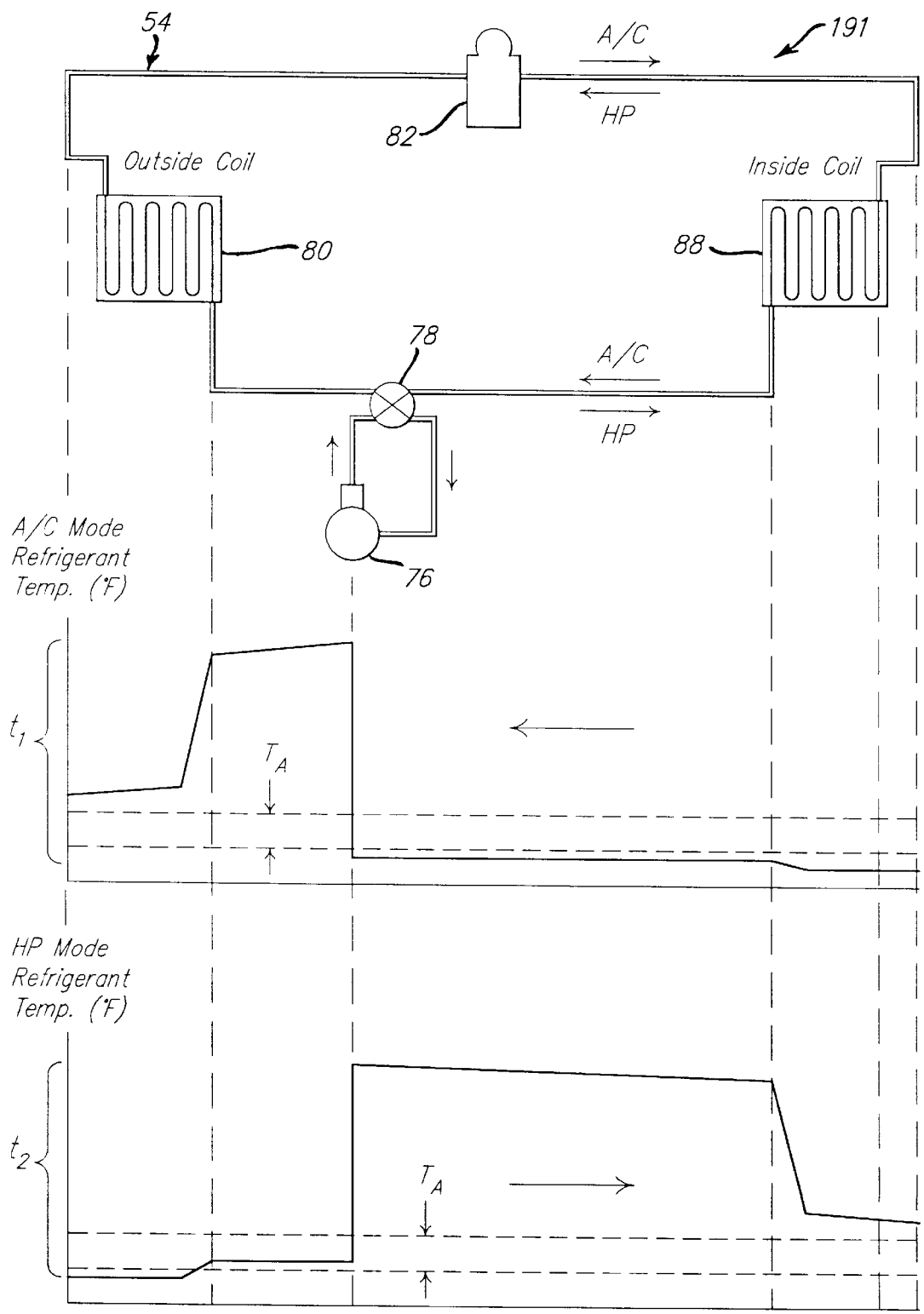
FIG. 10 is a datagram illustrating the relationship between the temperature cycle and a schematic representation of an HVAC system.

Anti-Fog System for Reversible Air Conditioning and Heat Pump HVAC System for Automobiles Referring to FIG. 10, a single loop reversible air conditioning and heat pump system 191 is illustrated with the corresponding temperature cycle diagrams for air conditioning mode 190 and heat pump mode 192. As will be described, the preferred embodiment of the present invention prevents undesirable fogging by slowly increasing the speed of compressor 76 over a predetermined period of time. Generally, in reversible HVAC systems fogging may occur during the transition from cooling mode to heating mode. Prior to describing the solution provided by the presently preferred embodiment, a brief description of the refrigeration cycle and how fogging occurs in a reversible system is provided with reference to FIG. 10.

The refrigeration cycle essentially uses a small amount of energy to power a compressor in order to transfer a greater amount of heat energy from one environmental region to another environmental region. It does this by using the cooling effect of evaporation to lower the temperature of the air passing through one heat exchanger (the evaporator) 88 and using the heating effect of condensing high temperature, high pressure gas to raise the temperature of the air passing through another heat exchanger (the condenser) 80. With reference to waveform $t_1$ of FIG. 10, drawn from right to left, the temperature profile of refrigerant flowing from an evaporator 88, through a compressor 76 and four-way switch 78, and then through a condenser 80 is illustrated. Refrigerant entering the evaporator 88 is at low pressure and low temperature. The temperature being the saturation temperature of the pressure reduced refrigerant. As the refrigerant passes through the evaporator 88 heat energy from air that is blown through the evaporator 88 is absorbed by the refrigerant. The air that exits the evaporator 88 is noticeably cooled due to the transfer of heat energy from the air to the refrigerant. The cooler air no longer has the capacity to retain the same amount of moisture as the warmer air that was blown into the evaporator 88, therefore the excess moisture condenses out of the air onto the external surface of the evaporator 88. The vapor state refrigerant flows from the evaporator 88 to the compressor 76 where it is compressed to a high pressure, high temperature vapor before flowing into the condenser 80.

When the controller 130 commands a change to heating mode the orientation of four-way switch 78 is changed, thus interchanging the refrigerant connections to the compressor 76, thereby reversing the flow of refrigerant through the system causing the heat exchangers to change functions. Referring to waveform $t_2$ of FIG. 10, drawn from left to right, pressure reduced refrigerant flowing into outside heat exchanger 80 (the evaporator) absorbs heat energy from the outside air which is blown through the evaporator 80. The refrigerant flowing through the evaporator remains at its saturation temperature for a majority of the traverse. As the refrigerant nears the end of the evaporator 80 the accumulated heat energy that has been absorbed causes the refrigerant to transition to a vapor state. Any further heat energy that is absorbed in the refrigerant causes the refrigerant temperature to increase beyond the saturation temperature into a superheated temperature range. The superheated refrigerant flows to the compressor 76 which compresses it to a high pressure, high temperature vapor which is directed to the inside heat exchanger (the condenser) 88. As the high temperature vapor flows into the condenser 88, the temperature of the condenser 88 rapidly rises to an equivalent temperature. Moisture that had accumulated on the inside coil 88 during the air conditioning mode begins to boil off as the condenser 88 increases in temperature. The moisture is absorbed by air flowing through condenser 88 into the passenger compartment. Fogging then occurs when the moisture laden air strikes the cold inside surface of the passenger compartment windows.

Figure 11:
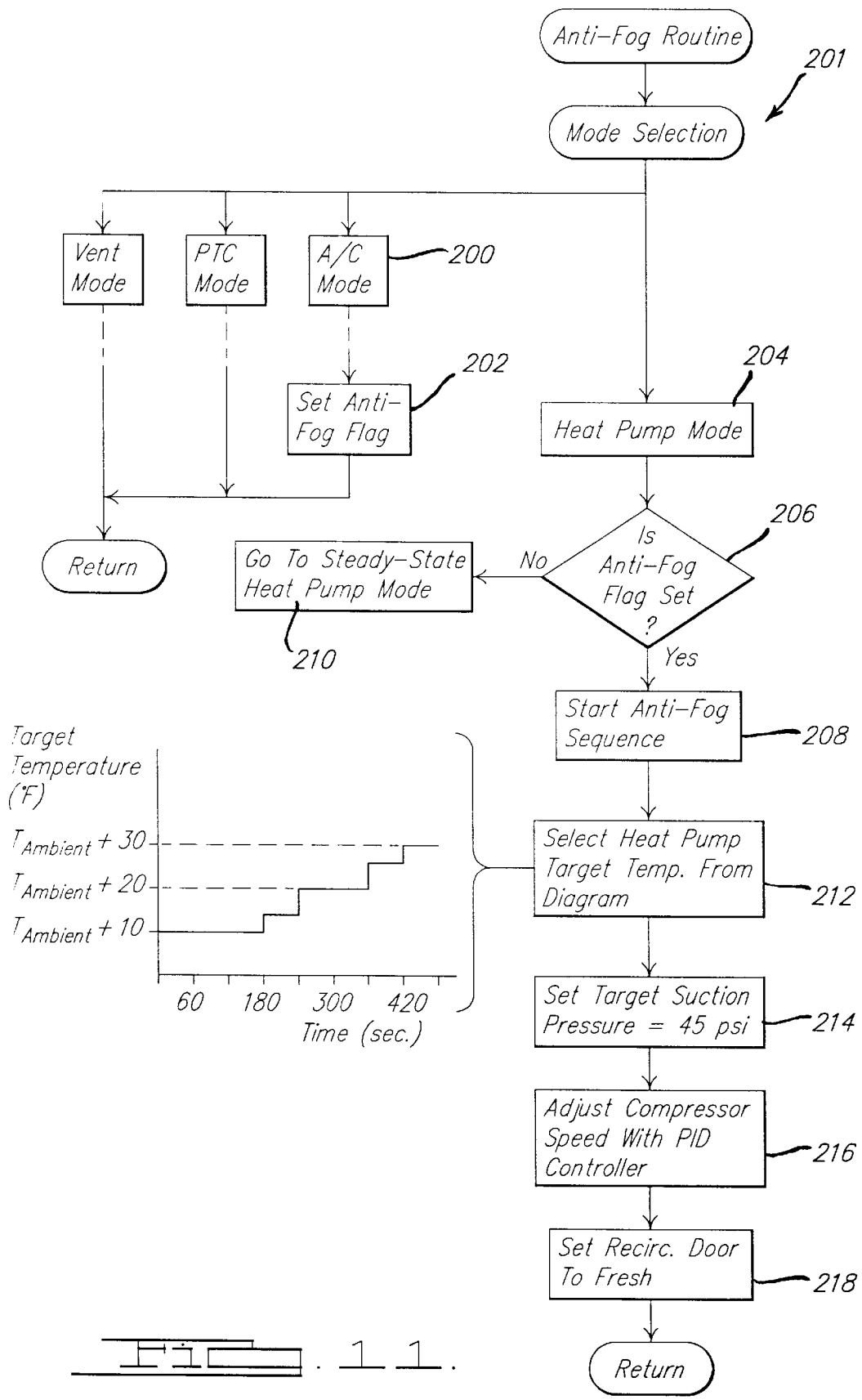
FIG. 11 is a flow diagram of the anti-fog algorithm for the preferred embodiment of the invention.

FIGS. 5 and 11 illustrate an exemplary anti-fogging system for controlling the operation of a reversible HVAC system 50 for automobiles. FIG. 5 as explained earlier in this specification illustrates a control system for an automotive HVAC system. Using the same hardware configuration, controller 130 minimizes the effects of fogging by gradually increasing the compressor speed at a predetermined rate and regulating the flow management center operation to ensure efficient use of the evaporator. Although a flow management center 82 is employed in the preferred embodiment it is within the scope of the invention to use a pressure reducing device with a separate receiver/drier. Additionally, the invention encompasses any variable speed or capacity compressor, even though the compressor in the preferred embodiment is an electric compressor.

Processor 140 is programmed to control the compressor speed and flow management center operation as depicted in the flowchart of FIG. 11. FIG. 11 provides a general overview of the main system operating modes and the detailed program steps related to the anti-fogging routine. In the preferred embodiment of the invention the steps that are included in the anti-fogging routine 201 are spread throughout a number of program modules such as the operating mode selection 152, compressor speed control 160, and EXV control 162 (see FIG. 6). Calculated changes to the outputs that control the speed of compressor 76 and the regulation of pressure reducing device 116 only occur within the designated modules. To clarify the included steps, they have been brought together and listed in anti-fog routine 201.

At step 200 the program enters air conditioning mode in which cooling air is blown into the passenger compartment. During air conditioning mode, as a byproduct of the refrigeration process moisture accumulates on the external surface of inside heat exchanger 88. At step 202 an anti-fog flag is set to provide an indication that there is moisture on the surface of the inside heat exchanger 88. The anti-fog flag will remain set until heat pump mode is entered at step 204.

At step 206 the program continues into the anti-fog sequence 208 if the anti-fog flag is set, otherwise it branches off to steady-state heat pump mode at step 210.

The anti-fog sequence begins with selecting a post-inside heat exchanger air target temperature and a duration of operation at step 212 from a table of values that are represented in the graph. The actual post-inside heat exchanger air temperature is measured by probe 133. The target temperature is set equal to the ambient plus an offset that is increased over time. Limiting the post-inside heat exchanger target temperature to a specified offset above ambient indirectly limits the temperature of the compressed refrigerant vapor that flows into the condenser 88. The evaporation rate of moisture located on the inside heat exchanger 88 is directly related to the refrigerant temperature at the inlet to condenser 88. Therefore, gradually increasing the target temperature causes a gradual increase in the compressor speed, which causes a gradual increase in the compressor discharge pressure, which results in a gradual increase in the refrigerant temperature at the inlet to the condenser, thereby limiting the evaporation rate of moisture on the condenser 88. At step 214 the compressor target suction pressure is set to 45 psi. Starting the suction pressure at 45 psi ensures that the starting discharge pressure and temperature are low enough to prevent uncontrolled moisture evaporation from the condenser 88. The suction pressure is related directly to the speed of compressor 76.

At step 216 a PID controller calculates the new compressor speed setting based upon the target temperature and previous suction pressure. The change in suction pressure from the previous setting is limited to prevent undesirable changes in compressor speed which could lead to high discharge temperatures and uncontrolled condenser moisture evaporation. Although the preferred embodiment of the invention controls the compressor speed to regulate the moisture evaporation rate, it is within the scope of the invention to control other system parameters such as suction pressure, discharge pressure, or condenser inlet temperature.

If the post-inside heat exchanger target temperature is less than the target temperature that correlates to the temperature lever 74 position, then the PTC heater 62 is turned on and the blend door 61 is set to a position that will enable the HVAC to achieve the temperature lever target temperature. The required door 61 position is obtained from a lookup table that correlates blend door position to differential temperature and airflow.

At step 218 the recirculation door 60 is set to the full fresh air position. Setting the recirculation door 60 to the full fresh air position in combination with slowly evaporating moisture from the condenser prevents fogging in the passenger compartment. As moisture is slowly evaporated off of the condenser it is absorbed by the fresh air flowing past the recirculation door 60, through inside heat exchanger 88, and into the passenger compartment. The moisture laden air flowing into the passenger compartment from the outside causes the internal air pressure to increase, acting to drive air out of the compartment through vents and other unsealed openings. Pushing air out the vents prevents an excessive amount of moisture laden air from accumulating in the passenger compartment as well as ensuring that the driest possible air is passed over the inside heat exchanger 88.

The anti-fog sequence continues until controller 130 has executed the table of values depicted graphically at step 212. Having completed the predetermined routine, all of the moisture that existed on inside heat exchanger 88 has evaporated and therefore the temperature of the refrigerant entering the condenser 88 no longer needs to be controlled.

The anti-fog flag is reset and the heat pump system transitions to normal steady-state heat pump mode in which the speed of the compressor 76 is controlled such that a desired duct outlet temperature as selected with temperature lever 74 is attained.

From the foregoing it will be understood that the invention provides a system which controls fogging when changing modes in a reversible HVAC system. Additionally, through the use of the anti-fogging method the rate of initial heating of the passenger compartment is not compromised. Additionally, the invention permits a system which controls fogging in an HVAC system when initially starting air conditioning mode.

Heating System in a Reversible Air Conditioning and Heat Pump HVAC System for Electric Vehicles FIGS. 5 and 12 illustrate an exemplary temperature control system for a reversible air conditioning and heat pump HVAC system for an electric automobile. FIG. 5 illustrates the interconnection of controller 130 to an automotive air conditioning circuit 50. Controller 130 controls the compressor speed, flow management center 82 operation, and blend door 61 positioning based upon inputs from front panel 55, duct 56, and the refrigerant system. The controller 130 is preferably a microprocessor-based circuit, that includes processor 140 for executing a program, its associated memory 142, an A/D 144 for converting analog signals into digital inputs, and a driver circuit 146 for interfacing with system components.

Figure 12A:
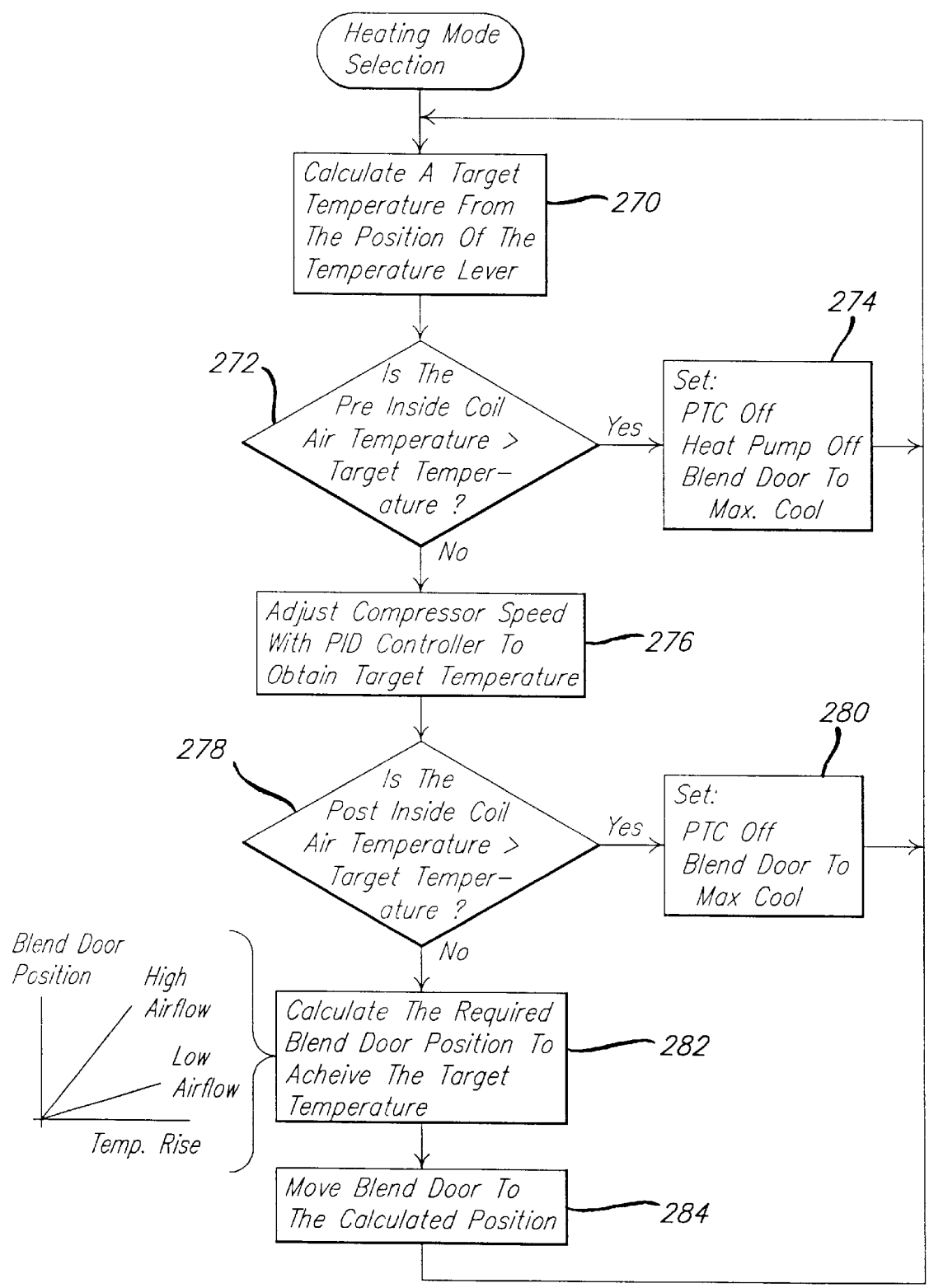
FIG. 12A is a flow diagram of the heating mode selection module for the preferred embodiment of the invention.

Processor 140 is programmed to control the heating mode selection that is depicted in the flowcharts of FIGS. 12A and 1213. The heating mode selection programs control the operation of the HVAC circuit 50 during a heating operation. In the preferred embodiment of the invention the steps that are included in the heating mode selection modules are spread throughout a number of program modules such as the operating mode selection 152, compressor speed control 160, and EXV control 162 (see FIG. 6). Calculated changes to the outputs that control the speed of compressor 76 and the regulation of pressure reducing device 116 only occur within the designated modules. To clarify the included steps, they have been brought together and listed in the two heating mode selection modules.

Heat to the passenger compartment is provided by a combination of the HVAC in heat pump mode and PTC heaters 62 depending on the ambient temperature and the requested target temperature as selected by the position of the temperature lever 74.

For ambient temperatures less than 40° F. heat is supplied only by the PTC heater as the reversible HVAC refrigerant system is disabled to prevent icing of the heat exchangers 80 and 88 which would result in reduced airflow and odors in the passenger compartment. At ambient temperatures greater than or equal to 40° F. heat is supplied by either the heat pump, the PTC heater 62, or the heat pump supplemented by the PTC heater 62.

Referring to FIG. 12A, at step 270 a target temperature is calculated based upon the position of temperature lever 74. A lookup table contains values that correlate temperature lever position to the target temperature of the air flowing from the duct outlets 64–68. The creation of a lookup table containing such values is well known in the art. At step 272 the target temperature is then compared to the temperature of air flowing into inside heat exchanger 88. The pre-indoor heat exchanger air temperature is measured by probe 132. If the air temperature at probe 132 exceeds the target temperature the PTC heater 62 is turned off, the heat pump is turned off, and the blend door 61 is set to the max cool position. In the max cool position air bypasses the PTC heater and flows directly to the duct outlets. During this mode of operation the outside air which flows into the duct 56 is warmer than the passenger has requested via the temperature lever 74. To cool the incoming air to the desired temperature the passenger has the option of enabling air conditioning mode.

For incoming air that is colder than the target temperature the compressor speed is adjusted by a PID controller at step 276 to drive the temperature of post inside heat exchanger air to the target temperature. As compressor speed is increased the refrigerant suction pressure and temperature decreases enabling the refrigerant to absorb a greater amount of heat from the external air as the refrigerant traverses the outside heat exchanger (evaporator) 80. The refrigerant is additionally compressed by the compressor to a greater discharge temperature and pressure prior to being routed to the inside heat exchanger (condenser) 88. The increased heat load of the refrigerant, obtained from the outside heat exchanger 80, is then transferred to the air flowing through the inside heat exchanger 88. The increased heat transfer causes a commensurate increase in the post inside heat exchanger air temperature, assuming the ambient temperature and air flow rate remains constant.

At step 278 the post inside heat exchanger air temperature is measured by probe 133 and compared to the target temperature. The post inside heat exchanger air temperature represents the air temperature prior to the PTC heater. If the air temperature is greater than the target temperature, then supplemental heat is not required to achieve the target temperature. Therefore, at step 280 the controller turns PTC heater 62 off, sets the blend door 61 to the max cool position, and returns to step 270 to begin another iteration. This is the normal operating loop during heat mode operation as the controller 130 regulates the air temperature to the selected target temperature. The post inside heat exchanger air temperature will exhibit normal closed loop operation by fluctuating slightly about the target temperature.

If the measured post inside heat exchanger air temperature is less than the target temperature, then the electric heater, PTC heater 62, is turned on. As the air flow rate across the PTC heater 62 increases, the heat output of the device increases thereby transferring a greater amount of heat to the passenger compartment. To regulate the quantity of heat that is transferred to the passenger compartment blend door 61 provides a path for a portion of the air to bypass the PTC heater 62 and recombine downstream with air that has flowed through the PTC heater 62. By reducing the quantity of air that flows over the PTC heater 62, less heat is transferred to the air, thereby reducing the commensurate increase in the temperature of the air, and providing a simple means of regulating the temperature of the recombined air.

At step 282 the required blend door position to achieve the target temperature is calculated in a manner known in the art. The required effectiveness represents the amount of PTC heating that is required to raise the temperature of the post inside heat exchanger air to the target temperature at the existing airflow across the PTC. At step 284 the controller 130 sets the position of blend door 61 and the loop returns to step 270 to start another iteration. This is the normal operating loop when supplemental heat from the PTC heater 62 is required to raise the duct outlet air to the requested temperature. Each time through steps 270, 272, 276, 278, 282, and 284 the position of the blend door 61 is varied slightly as the controller 130 responds to changing conditions.

Figure 12B:
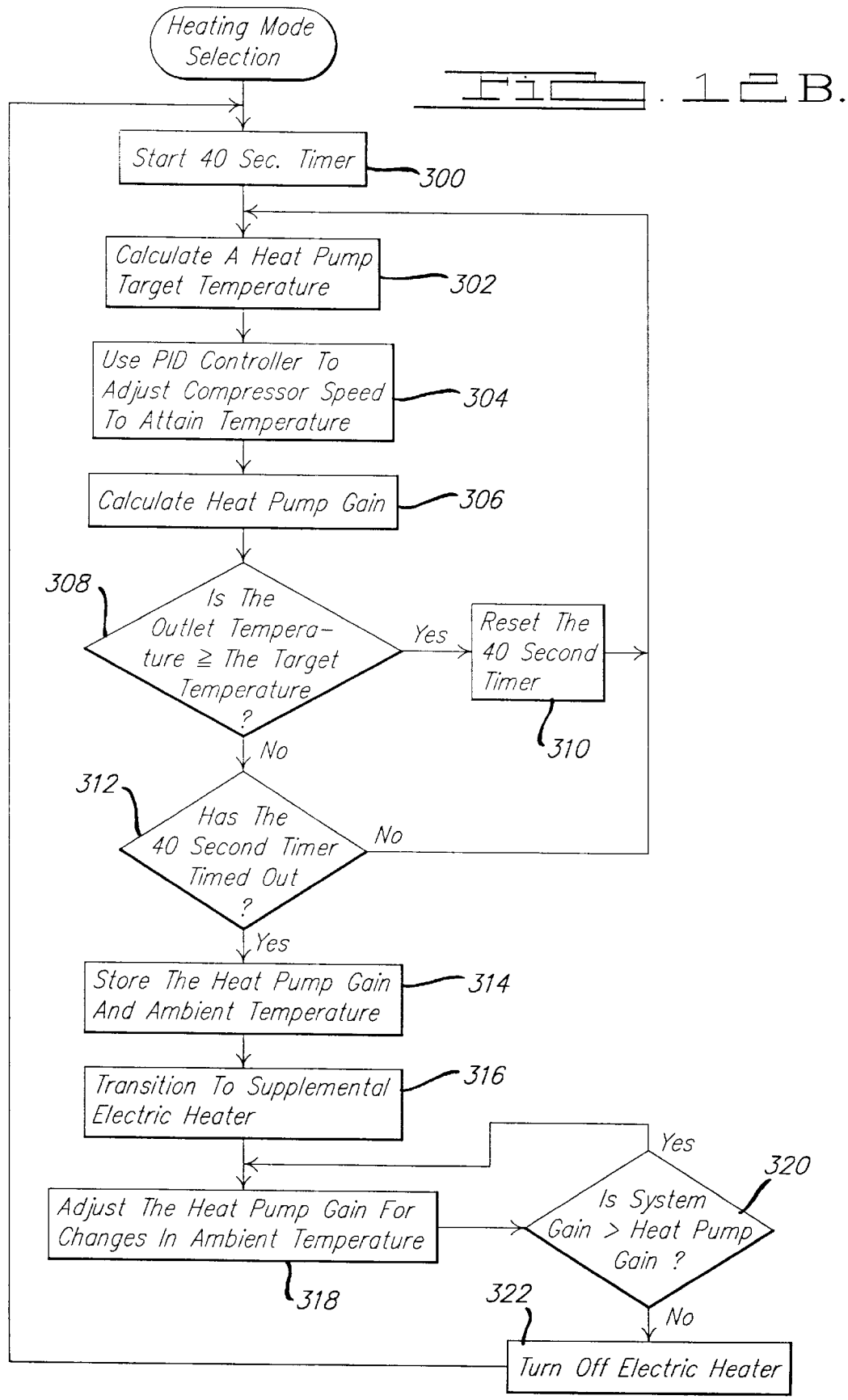
FIG. 12B is a flow diagram of an alternative heating mode selection module for the preferred embodiment of the invention.

Alternatively, the heating mode selection program can be implemented as illustrated in FIG. 12B. The program illustrated in FIG. 12B is particularly suitable for operating modes where the overhead energy that is expended turning on the heat pump or PTC heater 62 exceeds the energy required to raise the passenger compartment temperature to the desired temperature. At step 300 a forty second timer is started. The timer sets the time period during which the heat pump attempts to attain the target temperature. At step 302 the heat pump target temperature is calculated based on the position of temperature lever 74. The compressor speed PID controller is adjusted at step 304 to drive the compressor speed towards attaining the target temperature. At step 306 the heat pump gain is calculated. The heat pump gain represents the work the heat pump contributes to raise the temperature of the passenger compartment under the existing operating conditions. The heat pump gain is set equal to the outlet temperature, probe 133, minus the inlet temperature, probe 132, divided by the outlet temperature. At step 308 the post-inside heat exchanger air temperature as measured by probe 133 is compared to the target temperature calculated at step 302 to determine if the heat pump is capable of attaining the target temperature. If the heat pump does attain the target temperature the forty second timer is reset at step 310 and the program returns to step 302. Additionally, if the heat pump has not attained the target temperature but the 40 second timer has not timed out, the program returns to step 302 to continue to attempt to attain the target temperature. However, if the heat pump does not attain the target temperature within 40 seconds then at step 314 the measured values for heat pump gain and ambient temperature are stored for later use. Although, in the preferred embodiment the heat pump is allowed 40 seconds to attain the target temperature, it is within the scope of the invention that the allowed time may range from about 0 seconds to beyond 40 seconds. For example, the heat pump heating capability may be characterized by factory test or simulation and a number representative of the capability may be stored in memory for later recall to determine if the heat pump is capable of attaining a target temperature.

At step 316 the heating mode transitions from the heat pump to PTC heater 62 by gradually decreasing the heat pump output and increasing the PTC heater 62 over a 40 second period. Making a gradual transition enhances passenger comfort by reducing the noticeability of the change in system operation. At step 318 the stored value for heat pump gain is adjusted for changes in ambient temperature. At step 320 the revised value for heat pump gain is compared to the system gain that represents the amount of work required to heat the passenger compartment to the target temperature. If the system gain exceeds the heat pump gain, there is insufficient capacity in heat pump mode for heating the passenger compartment, therefore the program remains in PTC heat mode and returns to step 318. If the heat pump gain exceeds the system gain, the heat pump is capable of supplying the required heat necessary to attain the target temperature. The program advances to step 322 and transitions from the PTC heater 62 to heat pump over a 40 second time period, finally returning to heat pump mode at step 300.

From the foregoing it will be understood that the invention provides a system which minimizes energy consumption during a heating operation of an automotive HVAC system. Additionally, the method can be employed to dynamically update the heating mode selection as operating conditions change. Also, through the use of the method the energy efficiency of an electric vehicle is increased. Additionally, the invention provides an energy efficient method for controlling the passenger compartment temperature of an electric vehicle.

Air Handling for HVAC System for Electric Vehicles

Figure 13:
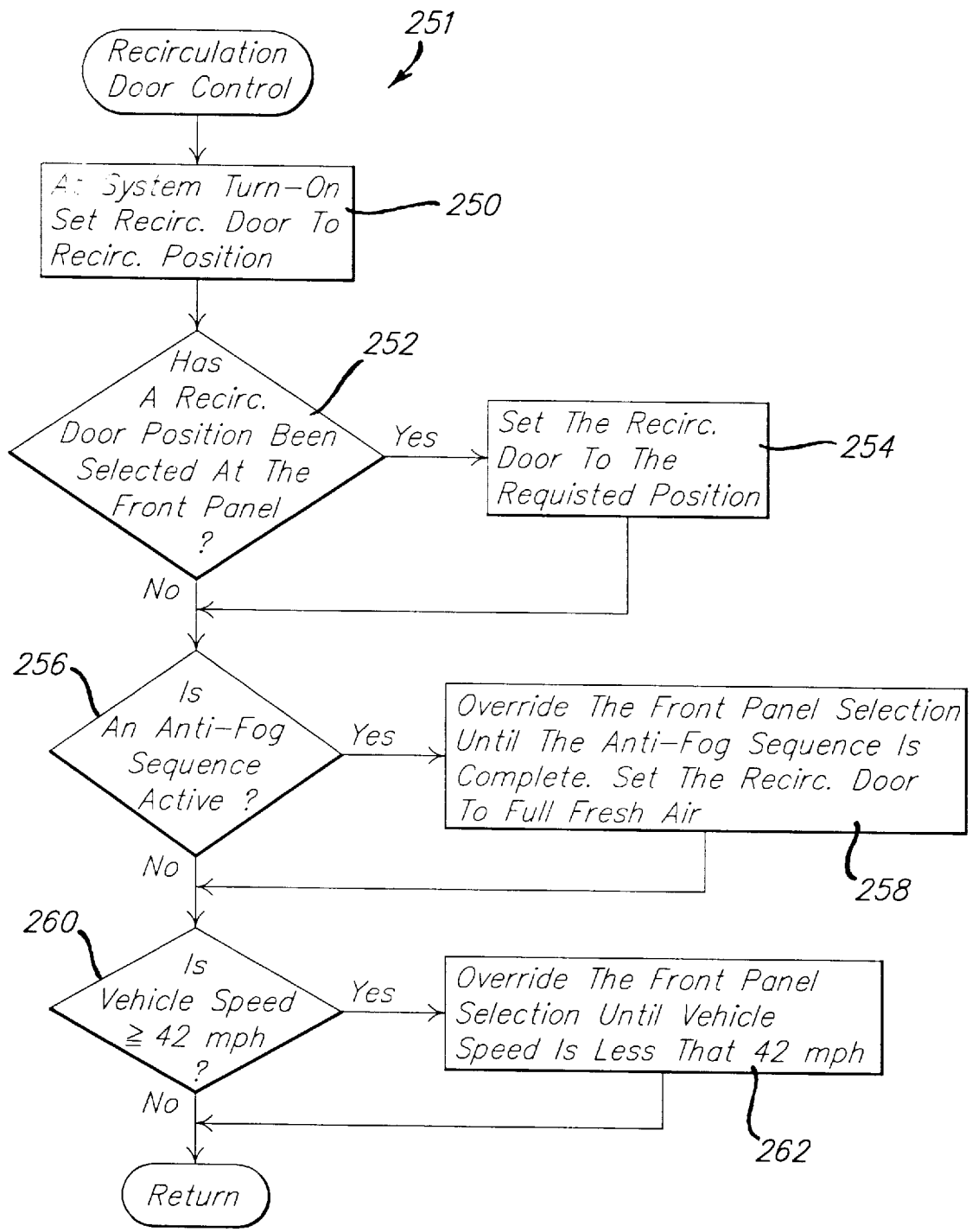
FIG. 13 is a flow diagram of the air-handling method for the preferred embodiment of the invention.

Referring to FIGS. 5 and 13, an air handling system for an electric vehicle HVAC system is illustrated. FIG. 5 illustrates the interconnection of controller 130 to an automotive air conditioning circuit 50. Controller 130 controls the compressor speed, flow management center 82 operation, and recirculation door 60 positioning based upon inputs from front panel 55, duct 56, and the refrigerant system. Recirculation door 60 may be set to any value from full fresh air, through part fresh air with part recirculated air, to full recirculated air.

The recirculation door control program 251 is illustrated in FIG. 13. Although FIG. 13 depicts all of the recirculation door program components existing in a single separate program module, it is within the scope of the invention for the different elements to be spread throughout the system program. In the preferred embodiment of the invention the steps that are included in the heating mode selection module are spread throughout a number of program modules such as the operating mode selection 152 and recirc. door positioning 154 modules (see FIG. 6). To clarify the included steps, they have been brought together and listed in the recirculation door control module.

When the system is turned-on, step 250 is executed and the recirculation door 60 is set to the recirculation position. By starting in the recirculation position less energy is consumed controlling the temperature of the passenger compartment. In recirculation mode, air from within the passenger compartment is routed through the inside heat exchanger 88 before being directed back into the passenger compartment. Therefore to raise the duct outlet air to the desired temperature the heat transferred from inside heat exchanger 88 only has to supplement the difference between the desired temperature and the temperature of the passenger compartment. In fresh air mode, to raise the duct outlet air to the desired temperature the heat transferred from inside heat exchanger 88 supplements the difference between the desired temperature and the temperature of the external air which is flowing into the passenger compartment.

Having set the recirculation door 60 to its initial position the program continues on to step 252 in which the inputs from the front panel 55 are interrogated to determine if a particular positioning of the recirculation door has been requested. If a recirculation door position change has been requested, then at step 254 the recirculation door is set to the requested position at step 254.

In step 256 the program optionally begins an anti-fog sequence. As is explained above, fogging of the passenger compartment windows may occur when the reversible HVAC system 50 switches from cooling mode to heating mode. During the cooling mode cycle moisture accumulates on the external surface of the inside heat exchanger 88 which functions as an evaporator. When the HVAC switches from cooling mode to heating mode the refrigerant flowing into the inside heat exchanger 88, which functions as a condenser, rapidly increases in temperature. As the refrigerant begins to raise the temperature of the condenser 88, moisture that had accumulated on the inside heat exchanger 88 during the cooling mode begins to boil off. The evaporating moisture is absorbed by air flowing through condenser 88 into the passenger compartment. Fogging then occurs when the moisture laden air strikes the colder windows of the passenger compartment.

At step 258 the air handling procedure during an anti-fog sequence is performed. The front panel selection for the recirculation door 60 position is overridden as the door 60 is set to the full fresh air position. With fresh air flowing into the passenger compartment the air pressure within the compartment increases, forcing air out of vents and door seal cracks. As new fresh air carrying its load of moisture is blown into the passenger compartment, pre-existing moisture laden air is forced out through the vents to the outside environment. The recirculation door 60 remains in the fresh air position until the anti-fog sequence is completed, at which time the recirculation door is reset to its former position.

In step 260 the program begins an air blow-by sequence. When the vehicle speed exceeds a predetermined value, such as approximately 42 mph, the pressure from air flowing into the fresh air duct 59 flows not only through the blower 58, but also back up through the recirculation air duct 57. The air flowing back into the recirculation air duct 57 bypasses the inside heat exchanger 88 and PTC heater 62 which are downstream from the recirculation door 60. Therefore, the air flowing back into the recirculation duct is unconditioned external air. The external air could vary from extremely cold dry air during winter months to very hot humid air during the summer months. The external air flows out of the duct inlets and directly onto the passengers in the passenger compartment.

At step 262 the program sets the recirculation door 60 to prevent an undesirable air blow-by event from occurring. The previous setting of the recirculation door 60 is overridden and the door is set to the full fresh air setting. The recirculation air duct 57 is blocked when the recirculation door 60 is in the full fresh air position, therefore the fresh air is forced through blower 58, inside heat exchanger 88, and PTC heater 62. The fresh air is properly conditioned to the desired temperature before being blown into the passenger compartment and no air flows back through the recirculation duct 57. Although in the preferred embodiment the recirculation door is set to the full fresh air setting it could alternately be set to the full recirculation air setting, in which case the fresh air duct 59 is blocked, preventing fresh air from flowing into the duct 56. Additionally, although in the preferred embodiment the setting of the recirculation door 60 is independent of the prior position of the recirculation door 60, the selection of the full fresh air setting versus the full recirculation setting could be based on the position of the recirculation door 60 prior to entering the air blow-by sequence.

From the foregoing it will be understood that the invention provides a system for selectively overriding the passenger air mixture selection under predetermined vehicle operating conditions to permit HVAC operating modes that enhance passenger comfort. Additionally, the system can be employed to improve vehicle performance by automatically adjusting the air mix during predetermined vehicle operating modes.

System for Cooling Electric Vehicle Batteries

Figure 14:
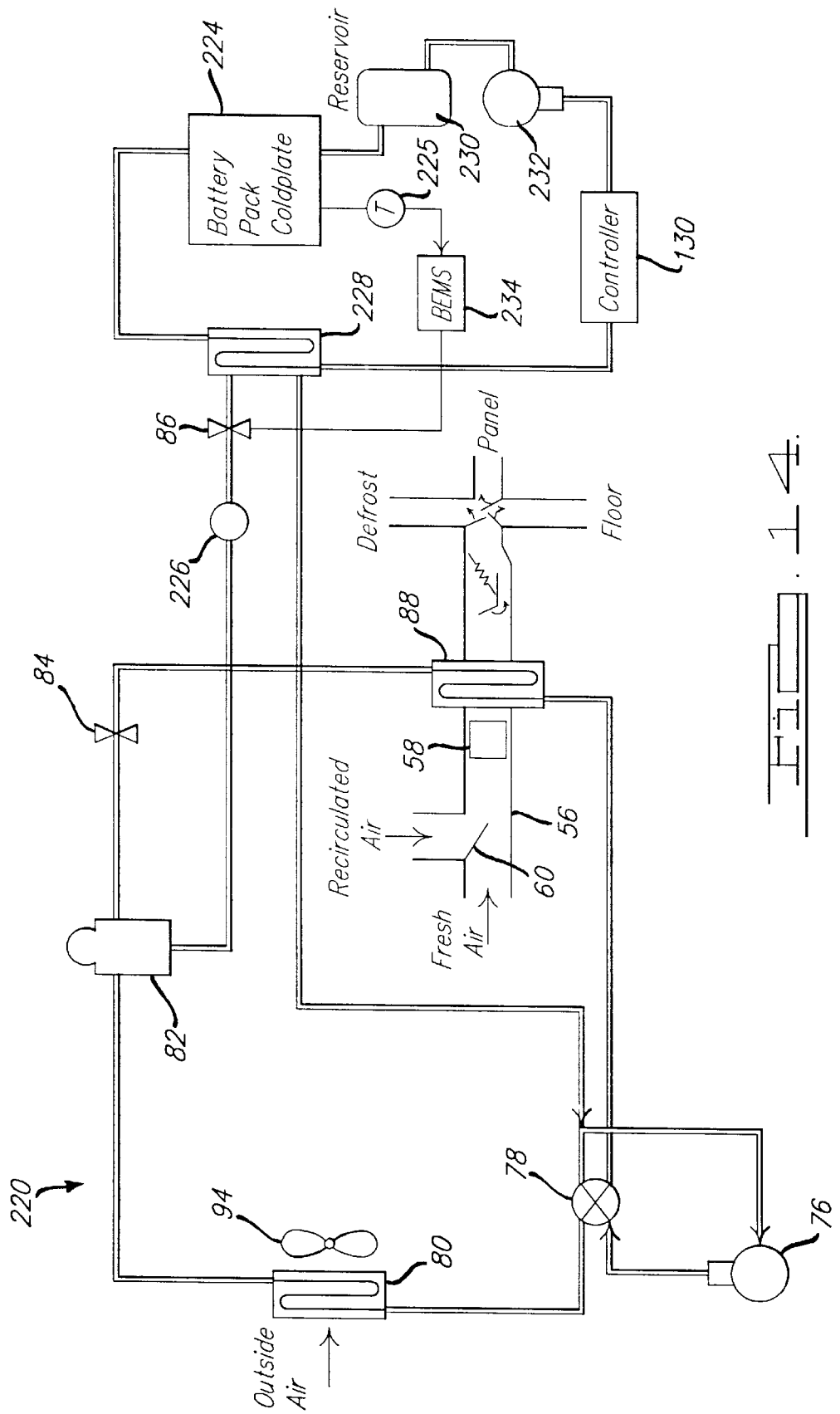
FIG. 14 is a schematic representation of a preferred embodiment of an HVAC system coupled to a battery pack module.

Referring to FIG. 14, a schematic of an automotive HVAC circuit 220 for an electric vehicle is illustrated. The HVAC circuit 220 is an alternative embodiment of the invention wherein heat from the battery pack 224 is used to supplement heating of the passenger compartment. The circuit 220 is similar to the HVAC circuit 50 illustrated in FIG. 1 with the addition of a heat exchanger circuit 222 for cooling a battery pack 224. A heat exchanger circuit 222 communicates with auxiliary heat exchanger 92 to cool battery pack 224 and controller 130, and includes a heat exchanger 228, a battery pack 224, a reservoir 230, and a pump 232.

Liquid high pressure refrigerant from flow management center 82 flows through expansion valve 226 and shut-off valve 86 into heat exchanger 228. Although high pressure refrigerant in the preferred embodiment is obtained from flow management center 82, it is within the scope of the invention to obtain high pressure refrigerant from other means such as a valve, a receiver/drier, or a reservoir. Additionally, although a thermal expansion valve is employed in the preferred embodiment, the principles of the invention may be readily extended to other pressure reducing means such as an electronic expansion valve. Shut-off valve 86 is included merely to show a possible method of controlling battery cooling by preventing the flow of refrigerant into heat exchanger 228. The refrigerant outlet of heat exchanger 228 is connected to the compressor 76 suction line such that the vapor is combined with refrigerant vapor from other system evaporators prior to flowing into the compressor 76 inlet.

The coolant outlet of heat exchanger 228 connects to battery pack 224 which includes the vehicle energy storage batteries. Heat is generated in the batteries during energy storage and discharge cycles due to energy losses from converting chemical energy to electrical energy. Heat from the batteries is transferred through the battery pack into the coolant. The outlet of battery pack 224 connects to reservoir 230 which connects to the inlet of pump 232. The pump 232 propels the coolant through heat exchanger circuit 222. Coolant from the pump 232 flows through controller 130, cooling the system electronics. The heat generated by the controller 130 is additionally transferred into the coolant. The controller 130 controls the operation of HVAC system 220. The temperature of battery pack 224 is sensed by temperature probe 225 which provides an input to the Battery Energy Management System (BEMS) 234. The BEMS 234 controls the operation of shut-off valve 86 in response to the temperature sensed by probe 225.

Figure 15:
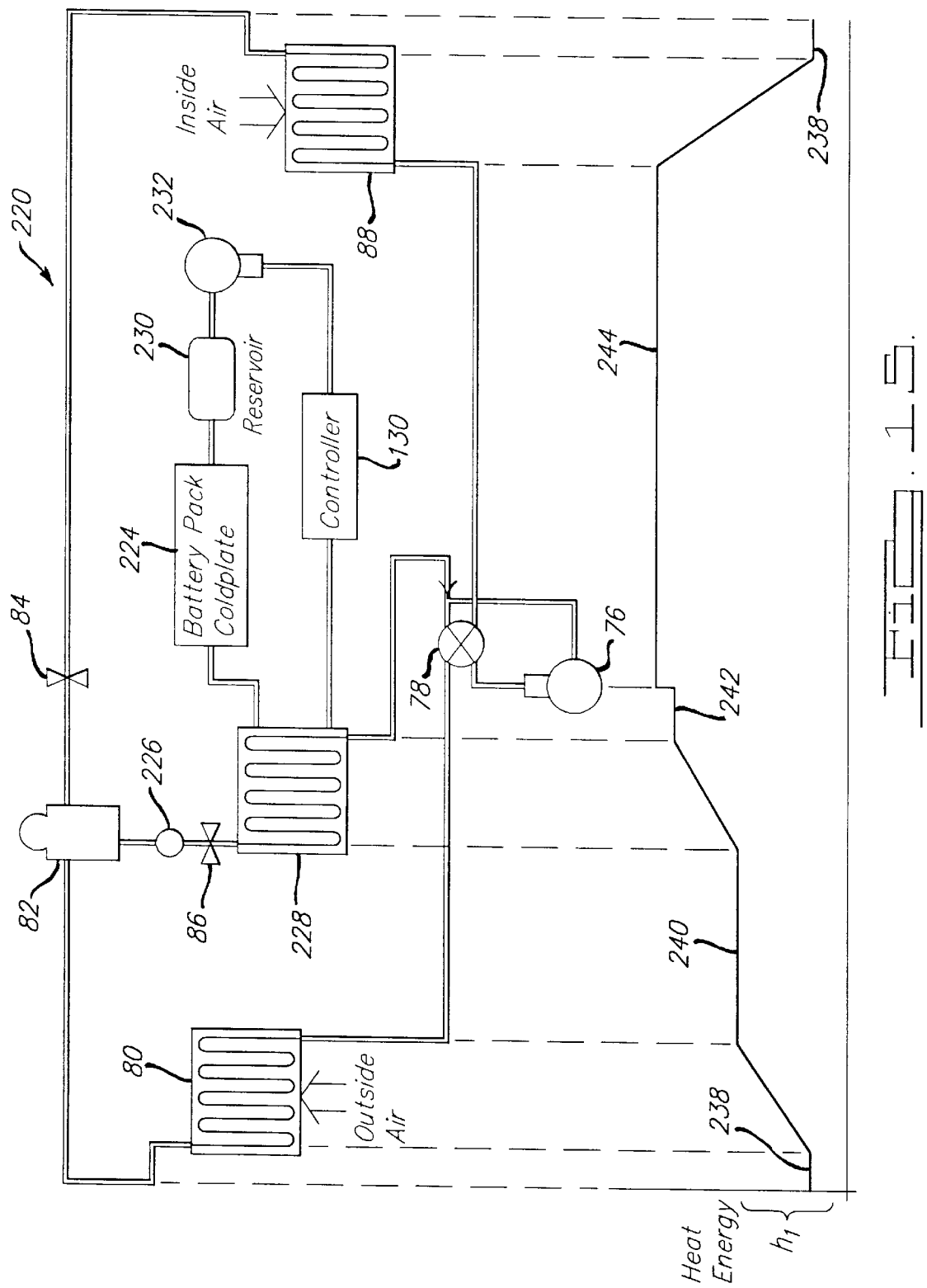
FIG. 15 is datagram illustrating the relationship between a preferred embodiment of the HVAC system and its heat load cycle.

FIG. 15 illustrates the operation of HVAC circuit 220. In this embodiment controller 130 sets four-way valve 78 such that the system heating mode is operational. High pressure, high temperature refrigerant flows from compressor 76 outlet through four-way valve 78 into inside heat exchanger 88 which functions as a condenser. Liquid refrigerant flows from the outlet of condenser 88 through shut-off valve 84 into a bi-directional port of flow management center 82. The refrigerant then splits with a portion flowing from an outlet of flow management center 82 to expansion valve 226, and the remainder of the refrigerant flowing out of the expansion valve 116 of the flow management center 226 to outside heat exchanger 80. Pressure reduced refrigerant flows through the outside heat exchanger 80 which functions as an evaporator absorbing heat energy from the outside air flowing through it.

In operation, the refrigerant that flowed from the outlet of flow management center 82 flows through expansion valve 226 and shut-off valve 86 before entering heat exchanger 228. The pressure reduced refrigerant that flows through heat exchanger 228 absorbs heat energy from coolant that is routed through heat exchanger circuit 222. The process by which heat energy is transferred from the coolant to the refrigerant in heat exchanger 222 is the same as what occurs in inside heat exchanger 88 the functioning of an evaporator described earlier. The coolant in circuit 222 flows through battery pack 224 absorbing heat from the vehicle batteries. The coolant then flows through reservoir 230 and pump 232 before absorbing additional heat from controller 130 prior to returning to heat exchanger 228. Hot coolant enters the heat exchanger 228 inlet and transfers its heat energy to the pressure reduced refrigerant flowing through the refrigerant line within the heat exchanger 228. The pressure reduced refrigerant transitions to the vapor state as it absorbs heat energy from the coolant. The vapor state refrigerant then flows through the four-way switch 78 before combining with vapor state refrigerant from outside heat exchanger 80 prior to the inlet to compressor 76.

Coolant continues to circulate through circuit 222 so long as the temperature of the battery pack 224 remains above 40° F. When the battery pack 224 temperature decreases below 40° F. the BEMS 234 disables shut-off valve 86 interrupting the flow of refrigerant to the heat exchanger 228. Coolant continues to flow through heat exchanger circuit 222 as the temperature of the battery begins to slowly increase. Once the temperature of the battery pack 224 once again rises above 40° F. the BEMS 234 enables shut-off valve 86, reestablishing the flow of refrigerant to the heat exchanger 228 and the transfer of heat from the heat exchanger circuit 224 to the HVAC circuit 220 resumes.

Waveform $h_1$ of FIG. 15 illustrates the heat cycle of HVAC circuit 220. Refrigerant flowing into evaporator 80 initially carries a heat load depicted as plateau 238. As the refrigerant flows through evaporator 80 it absorbs heat energy from outside air that is blown through the evaporator 80. Meanwhile, refrigerant flowing through heat exchanger 228 also carries a heat load depicted as plateau 238. The refrigerant flowing through heat exchanger 228 absorbs heat energy that is transferred from the battery pack 224 of heat exchanger circuit 222. The heat load of the refrigerant increases to plateau 242 when the vapor state refrigerant from heat exchangers 80 and 228 combines prior to compressor 76. The refrigerant heat load further increases to plateau 244 when compressor 76 compresses the vapor state refrigerant to a high pressure, high temperature vapor. The stored refrigerant heat energy decreases to plateau 238 as the refrigerant traverses the inside heat exchanger 88 and the heat energy is transferred to air that is blown through into the passenger compartment.

Using waste heat from the battery pack to supplement heat energy absorbed from the outside air for heating the passenger compartment provides a number of advantages. It expands the operating conditions under which heat mode operation of the HVAC is possible by increasing the stored energy in the refrigerant. It improves the efficiency of the overall vehicle system by reducing the need to rely on electric energy to heat the passenger compartment. Where conventional systems would exhaust the battery pack waste heat to the external environment and use electric energy from the batteries to provide supplemental heat to the passenger compartment, the invention reduces the need for electrical heating by using the waste heat from the batteries to supplement the heat pump system.

During cooling mode the flow of the refrigerant through the main loop is reversed from heat pump mode. Heat from air passing through the inside heat exchanger (evaporator) 88 is absorbed by the refrigerant. The refrigerant flowing through local-zone heat exchanger 228 continues to absorb heat from the heat exchanger circuit 222 (refer to FIG. 14). The refrigerant from the local-zone heat exchanger 228 combines with refrigerant from inside heat exchanger 88 prior to compressor 76. The refrigerant is compressed further adding to the heat load and directed to the outside heat exchanger 80 (condenser). As the refrigerant traverses the condenser 80 the combined heat load is shed to the outside air that flows through the condenser 80. The refrigerant then flows to the flow management center 82 and then through the remainder of the circuit.

From the foregoing it will be understood that the invention provides a system for increasing the operating range of an automotive heat pump system. Additionally, the invention provides a system for improving the energy efficiency of an electric automobile. Further, the invention provides a system for efficiently distributing the heat energy of an electric automobile. Also, a method is presented for cooling the battery pack of an electric vehicle.

Advantages of the invention

From the foregoing it will be understood that the invention provides a flow management device with bi-directional ports in which refrigerant flowing into either port passes through an expansion valve and exits the other port. Additionally, the invention can integrate the receiver/drier function into a flow management device with bi-directional ports to provide the capability of tapping off refrigerant flow for secondary cooling circuits. Also, the present invention decreases the complexity of automotive HVAC systems by integrating a flow management device into the system to reduce the number of valves required to implement a reversible heating and cooling HVAC system. A further capability of the invention is to provide a centralized flow management center with taps for refrigerant to reduce the complexity of automotive HVAC systems that implement multi-zone control.

The invention provides a system for improving the steady-state response time of an automotive HVAC system. Additionally, the invention permits a reduction in the start-up time of an automotive air conditioning system. Also, the invention provides a system for controlling an HVAC system that employs a flow management device. The invention further provides a system for controlling an HVAC system incorporating a centralized flow management center.

The invention provides a system which controls fogging when changing modes in a reversible HVAC system. Additionally, through the use of the anti-fogging method the rate of initial heating of the passenger compartment is not compromised. Additionally, the invention permits a system which controls fogging in an HVAC system when initially starting air conditioning mode.

The invention provides a system which minimizes energy consumption during a heating operation of an automotive HVAC system. Additionally, the method can be employed to dynamically update the heating mode selection as operating conditions change. Also, through the use of the method the energy efficiency of an electric vehicle is increased. Additionally, the invention provides an energy efficient method for controlling the passenger compartment temperature of an electric vehicle.

The invention provides a system for selectively overriding the passenger air mixture selection under predetermined vehicle operating conditions to permit HVAC operating modes that enhance passenger comfort. Additionally, the system can be employed to improve vehicle performance by automatically adjusting the air mix during predetermined vehicle operating modes.

The invention provides a system for increasing the operating range of an automotive heat pump system. Additionally, the invention provides a system for improving the energy efficiency of an electric automobile. Further, the invention provides a system for efficiently distributing the heat energy of an electric automobile. Also, a method is presented for cooling the battery pack of an electric vehicle.

Although certain preferred embodiments of the invention have been herein described in order to afford an enlightened understanding of the invention, and to describe its principles, it should be understood that the present invention is susceptible to modification, variation, innovation and alteration without departing or deviating from the scope, fair meaning, and basic principles of the subjoined claims.

What is claimed is:

1. An air-flow management system for controlling a flow of air into a passenger compartment of a motor vehicle, the air-flow management system comprising:

an air-flow structure defining therein an air passageway to the passenger compartment;

a blower for forcing air through the air passageway towards the passenger compartment;

a reversible heat pump system in communication with the air-flow structure for transferring heat energy between an outside environment and the passenger compartment, said heat pump system having multiple operating modes including a cooling mode and a heating mode;

a recirculation door movable to control a mixture of recirculated air and fresh air that flows through the air-flow structure, said recirculation door having a plurality of positions ranging from a full fresh position to a full recirculation position; and a controller for selecting the operating mode of the heat pump wherein selecting the heating mode after operating in the cooling mode results in moisture evaporating into the air flow directed into the passenger compartment, said controller additionally operable to select the position of the recirculation door such that the mixture of recirculated air to fresh air is selected so that the air pressure within the passenger is increased causing air within the passenger compartment to be purged to the outside environment, thereby reducing the possibility of fogging of the motor vehicle.

2. The air-flow management system of claim 1 wherein the controller sets the recirculation door to the full fresh position.

3. The air-flow management system of claim 1 further comprising a recirculation door selection input coupled to the controller for providing a desired door position signal, wherein the recirculation door is set to a requested position corresponding to the desired door position signal; and wherein in response to a fogging condition the controller overrides the desired door position signal and sets the recirculation door to the full fresh position.

4. The air-flow management system of claim 3 wherein the controller resets the recirculation door to the requested position when the fogging condition ceases.

* * * * *